United States Patent [19]

Pierrat

[11] Patent Number: 5,184,260
[45] Date of Patent: Feb. 2, 1993

[54] MAGNETIC TAPE DRIVE WITH INTEGRAL MULTIPLE-CASSETTE REMOVABLE MAGAZINE

[75] Inventor: Michel A. Pierrat, Boulder, Colo.

[73] Assignee: Ency Nova Inc., Boulder, Colo.

[21] Appl. No.: 727,647

[22] Filed: Jul. 9, 1991

Related U.S. Application Data

[63] Continuation-in-part of Ser. No. 555,576, Jul. 10, 1990, abandoned, and a continuation-in-part of Ser. No. 679,910, Apr. 3, 1991, abandoned.

[51] Int. Cl.$^5$ .............................................. G11B 15/68
[52] U.S. Cl. ........................................................ 360/92
[58] Field of Search ........................... 360/92; 414/932

[56] References Cited

U.S. PATENT DOCUMENTS

| | | | |
|---|---|---|---|
| 3,603,597 | 9/1971 | Haake | 274/4 F |
| 3,658,193 | 4/1972 | Gross | 214/6 D |
| 3,797,923 | 3/1974 | Thevenaz | 352/123 |
| 3,848,264 | 11/1974 | Wilson | 360/92 |
| 3,883,895 | 5/1975 | Kawaharasaki | 360/92 |
| 4,071,857 | 1/1978 | Whitney et al. | 390/92 |
| 4,614,474 | 9/1986 | Sudo | 414/281 |
| 4,860,133 | 8/1989 | Baranski | 360/92 |
| 5,089,920 | 2/1992 | Bryer et al. | 360/92 |

*Primary Examiner*—Robert S. Tupper
*Attorney, Agent, or Firm*—E. T. Barrett

[57] ABSTRACT

A number of data storage cassettes are held in a removeable magazine that forms part of a tape drive by which the magnetic tapes are recorded or played. The magazine holds two parallel vertically-displaced decks of cassettes that are moved under positive driving force along a rectangular pathway formed by the two decks. From a pick-up position in the magazine, a cassette is automatically extracted by a robotic arm and placed in the tape platform for reading or writing by a conventional tape drive mechanism. When the use of the cassette is finished and it is ejected by the tape drive, a sensor activates the robotic arm to return the cassette to the pick-up position. Each deck has one unoccupied cassette space. If during the sequence of operations, the cassettes on the lower deck are moved by the width of one cassette in one direction, the cassettes on the upper deck are moved the same distance in the opposite direction. This movement results in a vacant position at the end of the upper deck farthest away from the pick-up position. The cassette in the pick-up position is either removed and loaded into the tape deck or the cycle is continued. Movement of the cassette is produced by reciprocating drivers along the sides of the magazines. The cassettes are moved in only one direction by the reciprocating drivers and are locked to prevent movement in the opposite direction. Motions of the cassette handling mechanisms are limited by mechanical stops that trigger an electronic circuit to interrupt the driving power eliminating the need for sensitive position switches. Slip clutches prevent mechanical damage from the mechanical stops. The removable magazine does not include any electric motor drives and is automatically disengaged from the cassette driving mechanism by its removal, thus permitting economical use of multiple magazines.

37 Claims, 18 Drawing Sheets

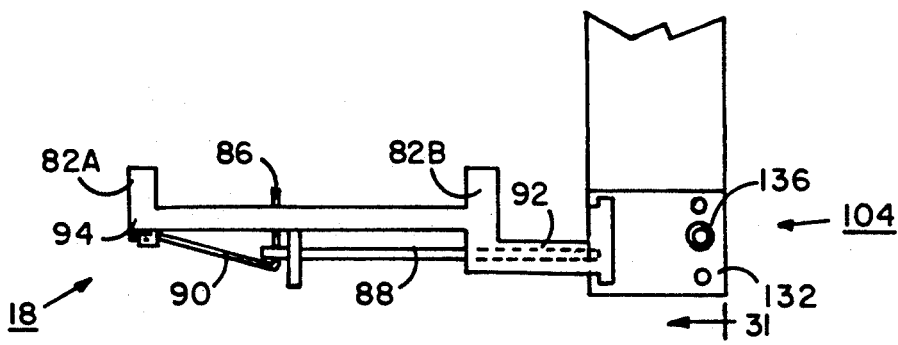
FIG. 34
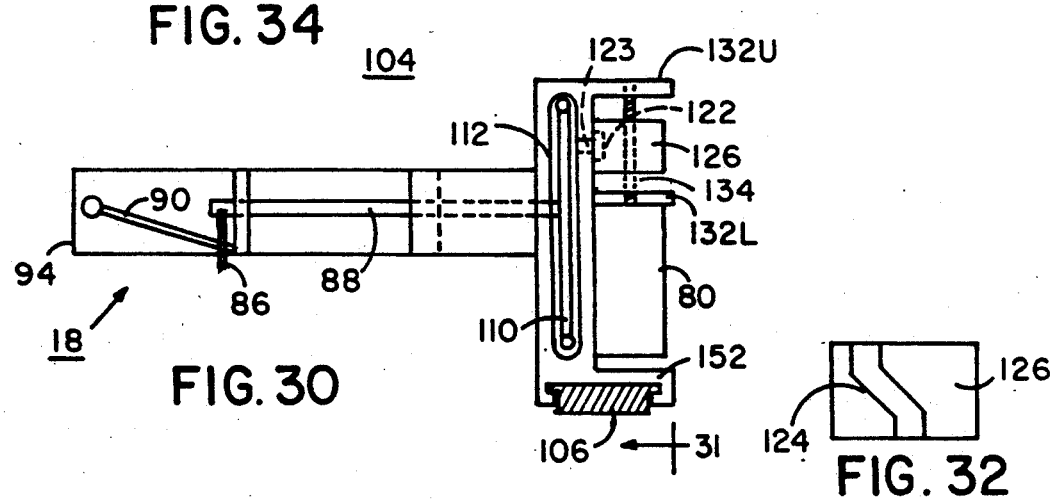
FIG. 30
FIG. 32
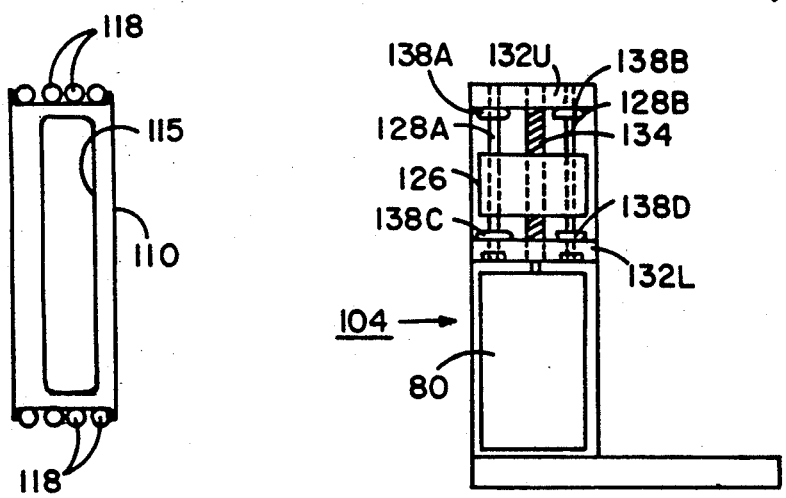
FIG. 33
FIG. 31

MAGNETIC TAPE DRIVE WITH INTEGRAL MULTIPLE-CASSETTE REMOVABLE MAGAZINE

REFERENCE TO RELATED APPLICATIONS

This application is a continuation-in-part of co-pending U.S. patent application Ser. No. 07/555,576, filed Jul. 10, 1990, now abandoned and of co-pending U.S. patent application Ser. No. 07/679,910, filed Apr. 3, 1991, now abandoned.

BACKGROUND OF THE INVENTION

1. Field of the Invention

This invention relates to a system and method for storing and retrieving magnetic tape cassettes of the kind ordinarily used for video, analog and digital sound, and for back-up of computer data. More particularly it relates to a tape transport platform for recording data on and reading data from magnetic tape cartridges or cassettes. The invention is described as incorporated in a computer data back-up system.

2. Description of Related Art

Magnetic tape cassettes are in wide use for recording and playing back both analog and digital signals. One particular application is for providing a back-up storage system for computer data. Such tape cassettes require little room and are capable of storing large amounts of data. In many instances, the cassettes are placed in and removed from the tape drive system manually. Various kinds of devices have been proposed for storing and recovering the tape cassettes automatically.

U.S. Pat. No. 3,603,597 to Haake describes a system for storing a number of cassettes in a storage bin and successively loading the cassettes into and removing them from a play station. A storage bin holds a number of cassettes in a vertical stack. The cassettes are removed from the bottom position and restored to the top position of the bin. The cassettes move vertically by gravity while in the bin, so horizontal operation of the bin is not feasible. The cassette gripper consists of a u-shaped member that receives the cassette through an open end which prohibits loading the cassette from one of the lengthwise edges.

U.S. Pat. No. 3,658,193 to Gross describes a cassette storage system in which the cassettes are stacked in a hopper positioned above the tape player. The cassettes are successively placed in the tape player and then discharged from the player into a discharge hopper. The cassettes are not returned to the original storage hopper.

U.S. Pat. No. 3,797,923 to Thavenaz shows a cassette handling mechanism in which image cassettes are moved into position for projection and then rewound automatically when returned to storage status.

U.S. Pat. No. 3,848,264 to Wilson shows a cassette storage chamber in which the casettes are positioned on edge in a horizontal row. A transducer for playing the tapes is mounted for horizontal movement along the row of cassettes. The cassettes are not moved individually from a storage position to a play position.

U.S. Pat. No. 3,883,895 to Kawsharasaki shows a cassette storage arrangement in which a first compartment contains cassettes to be positioned in the player while a second compartment receives the cassettes after playing and replaces a cassette from the second compartment as the bottom most cassette in a stack of cassettes in the first compartment. No arrangement for gripping and handling individual cassettes away from the storage chamber is shown.

U.S. Pat. No. 4,071,857 to Whitney et al. discloses a cassette handling system in which cassettes from a first storage magazine are fed into a player and from the player into a separate output magazine. The cassettes are conveyed by an endless conveyor. No system is shown for handling individual cassettes away from the storage compartment.

U.S. Pat. No. 4,860,133 to Baranski describes a large cassette library in which cassettes are loaded manually into one side of the storage assembly and removed automatically from the other side for playing. No mechanism for handling individual cassettes apart from the storage assembly is described.

Most of the previous cassette storage systems are large relative to the tape drive mechanism and are not generally applicable to the back up of computer data where it is desirable to position a cassette magazine within the computer cabinet or as a separate compact cassette storage and tape drive.

SUMMARY OF THE INVENTION

A number of data storage cassettes are held in a removeable magazine. The magazine forms part of a tape drive by which the magnetic tapes are recorded or played. In a typical system, the tape drive records digital computer back-up data onto a cassette until the tape is filled. The tape is then automatically removed from the tape drive, replaced in the storage magazine, and a new tape placed in the tape drive. When the tapes have reached the full storage capacity, or after some predetermined time interval, the magazine is removed and replaced with a new magazine containing unrecorded tape cassettes.

The removable magazine holds two parallel decks of magnetic tape cassettes that are moved under positive driving force along a continuous rectangular pathway formed by two vertically-displaced decks. From a pick-up position in the magazine, a cassette is automatically extracted by a robotic arm and placed in the tape platform for reading or writing by a conventional tape drive mechanism. When the use of the cassette is finished, it is ejected by the tape drive. A sensor activates the robotic arm to return the cassette to the pick-up position.

Each deck has one unoccupied cassette space. If during the sequence of operations, the cassettes on the lower deck are moved by the width of one cassette in one direction, the cassettes on the upper deck are moved the same distance in the opposite direction. This movement results in a vacant position at the end of the upper deck farthest away from the pick-up position. The cassette in the pick-up position is either removed and loaded into the tape deck or the cycle is continued with the cassettes on the upper deck moving one cassette width toward the rear of the magazine and those on the lower deck moving forward. One of the cassettes is then lifted automatically from the lower deck to fill the pick-up position while simultaneously the cassette on the upper deck at the rear of the magazine is forced downward into the lower deck. By this means any tape cassette in the magazine may be selected to be loaded into the tape drive. For usual back-up functions, the tapes are loaded sequentially into the tape drive until all of the tapes are full, at which time the magazine is replaced by another magazine carrying a supply of unrecorded tapes.

Movement of the cassettes is produced by reciprocating drivers along the sides of the magazines. The cassettes are moved in only one direction by the reciprocating drivers and are locked to prevent movement in the opposite direction.

During transport between the magazine and the tape drive mechanism, the cassette is held by a gripper that engages one surface of the cassette at spaced points and a movable, spring biased, clamping member that engages the opposite side of the cassette adjacent the rear edge of the cassette. The unique construction minimizes the needs for sensitive switch elements and operates with high efficiency to minimize the load imposed on the computer power supply.

The storage system is formed into an integral structure with a standard tape player and no modification of the tape drive unit is required. In contrast from the usual stacker that requires as many empty spaces as there are cassettes, the horizontal magazine of this invention requires only two empty spaces irrespective of the number of cassettes.

The magazine that holds the cassettes is removable from the storage unit permitting an unlimited potential library of cassettes. The removable magazine does not include any electric motor drives and is automatically disengaged from the cassette driving mechanism by its removal, thus permitting economical use of multiple magazines. The robotic arm that removes the cassettes from the pick-up position is completely out of the way when not in use of facilitate removal and replacement of the magazine.

BRIEF DESCRIPTION OF THE DRAWING

FIG. 30 is an elevational view of the gripper assembly;

FIG. 31 is a diagrammatic rear view of the gripper opening and closing mechanism along line 31—31 of FIG. 30;

FIG. 32 is a face view of the lead nut showing the angular slot;

FIG. 33 is a face view of an internal control member for opening and closing the gripper;

FIG. 34 is a diagrammatic top view of the cassette gripper;

DESCRIPTION OF THE PREFERRED EMBODIMENT

The drawings are intended to illustrate the general manner of construction and are not to scale. In the description and in the claims, the terms vertical, horizontal, and the like are used for descriptive purposes. However, it is understood that the embodiment of the invention described here is capable of operation in any orientation and the terms so used are only for the purpose of describing relative positions and are interchangeable under appropriate circumstances. For example, the cassette decks are described as extending horizontally. The unit, however, may be used with the decks in a vertical plane and the terms vertical and horizontal are then interchanged.

Figure 1:
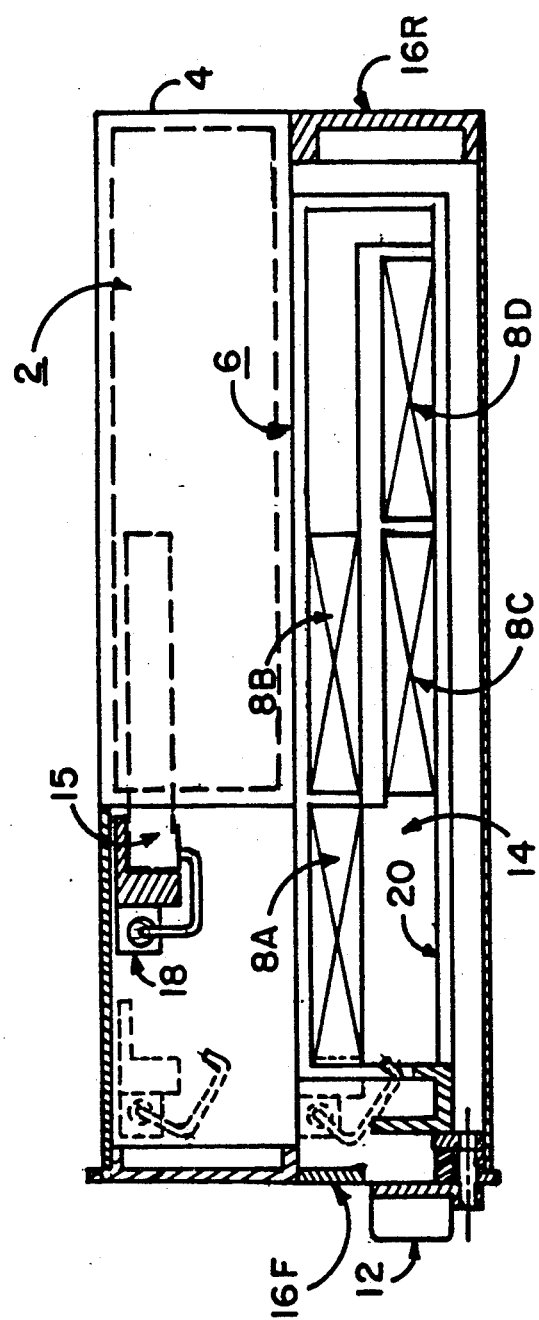
FIG. 1 is a longitudinal cross section through a tape drive with a removable magazine holding four tape cassettes.

As shown in FIG. 1, a conventional tape drive, generally indicated in broken outline at 2, is mounted in a housing 4 along with a removable magazine, generally indicated at 6, that stores the tape cassettes 8. The cassette magazine 6 is locked in position within the housing 4 by a lever 12.

The tape drive 2 is conventional in every respect and the loading and unloading functions associated with the magazine 6 are modified in each case to adapt them to the particular dimensions and characteristics of the tape drive. In the embodiment illustrated here, the magazine 6 is positioned below the tape drive 2 and the entrance to the tape drive, for loading and unloading the cassettes, faces the forward end of the housing 4 (toward the left as viewed in FIG. 1). The "entrance position" where casettes are delivered by the tape drive 2 for transfer to the magazine 6 is indicated at 15. The operation of the loading and unloading functions of the tape drive and the magazine is controlled by conventional electronic circuits of known design and are not described here. For example, in a typical system for storing back-up data for a computer, the magazine 6 holds four cassette tapes 8, although magazines holding six or more cassettes can be constructed in the same manner as described here merely by lengthening the magazine. Initially an unrecorded cassette is loaded from the magazine into the tape drive where it records back-up date until the tape is fully recorded. The tape cassette is then expelled from the tape drive and, when the presence of a tape cassette is sensed at the entrance of the tape drive 2, the cassette is automatically replaced in the magazine 6. The cassettes in the magazine are then shifted in position and a new unrecorded tape cassette is placed in the tape drive 2. This process continues until all four of the tape cassettes are fully recorded. When the last fully-recorded cassette has been replaced in the magazine 6, a signal alerts the operator for replacement of the magazine. The entire operating procedures are automatic under the control of known electronic circuits.

As shown in FIG. 1, four tape cassettes, indicatd at 8A, 8B, 8C and 8D are positioned in the magazine 6. The cassettes are lying flat in two decks one above the other. The cassettes 8A and 8B are on the upper deck and cassettes 8C and 8C are on the lower deck. The cassette 8A is shown in the "pick-up" position on the upper deck. It is from this position that a cassette is removed from or replaced in the magazine.

The space, indicated at 14, directly beneath cassette 8A is vacant. When it is desired to remove a cassette from the magazine other than the one in the pick-up position, the two cassettes 8A and 8B are moved together horizontally one cassette space toward the rear end of the magazine 6, indicated at 16R. Simultaneously the cassettes 8C and 8D are transferred horizontally one cassette width toward the front end of the magazine, indicated at 16F, so that the cassette 8C occupies the position directly beneath the pick-up position vacated by cassette 8A. This is the "home" position of the cassettes inside the magazine when the magazine is removed from the tape drive. When a cycle of operation is initiated, the cassette C is then transferred vertically from the lower to the upper deck to occupy the pick-up position. Simultaneously, the cassette 8B is transferred vertically from the upper to the lower deck into the empty space vacated by the cassette 8D.

This succession of vertical and horizontal movements, in which each cassette follows a unidirectional rectangular path, continues until a desired cassette is located in the pick-up position. The cassettes are transferred to and from the tape drive 2 by a cassette gripper, generally indicated at 18, which is shown in FIG. 1 in solid lines at its load/unload position at the entrance 15 to the tape drive 2. Other positions assumed by the cassette gripper are shown in dotted outlines. The construction and operation of the gripper 18 will be described more fully later.

Figure 9:
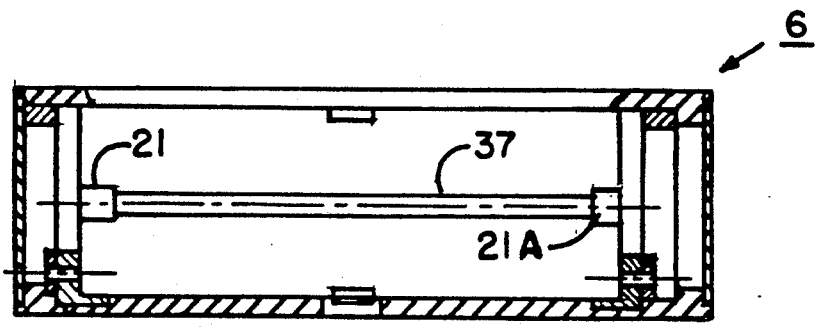
FIG. 9 is a cross section along line 9—9 of FIG. 8.
Figure 10:
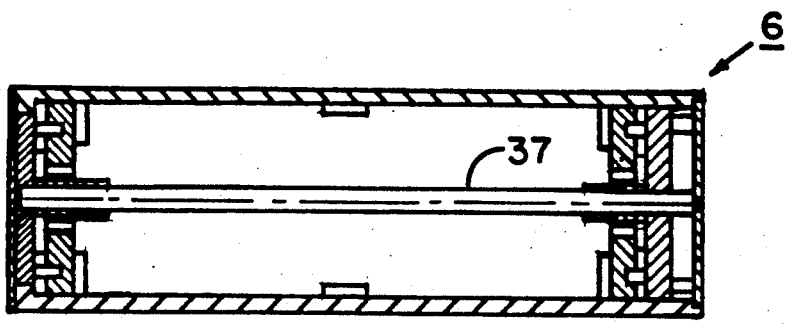
FIG. 10 is a section along line 10—10 of FIG. 4.
Figure 11:
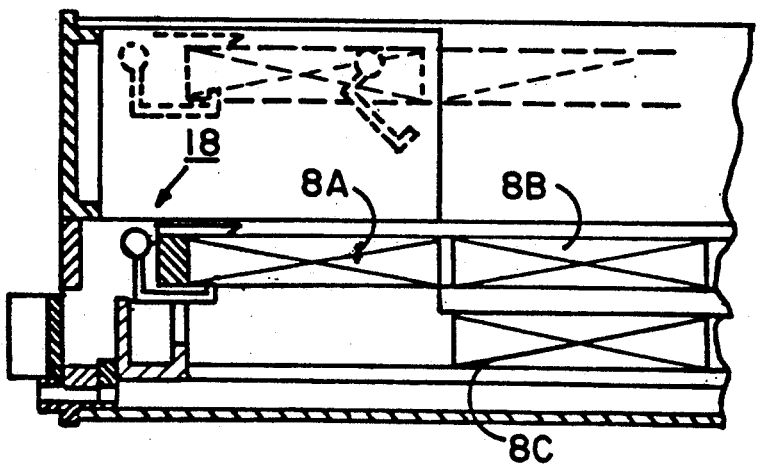
FIG. 11 is a partial cross section similar to FIG. 1 showing the gripper engaging a cassette in the pick-up position.

The cassettes in the bottom deck rest on the floor 20 of the magazine with the cassettes positioned beneath support members 21 and 21A (FIG. 9). These supports provide support for the center cassette position of the upper deck, but are terminated at the front and rear edges of that position to permit transfer of the cassettes from one deck to another at the ends of the magazine.

To move the cassettes horizontally on the upper deck, a pair of rams 32UL and 32UR (FIG. 14) are positioned in grooves in the walls and bottom and top covers of the magazine to reciprocate longitudinally. The ram 32UR carries a projecting tab 33UR at the end that engages the rear end of the cassette in the pick-up position, as the ram moves toward the end 16R (to the right as viewed in FIG. 14), the tab 33UR (along with a similar tab on the opposing ram 32UL) pushes the upper cassette in the pick-up position toward the right. The ram 32UL is a mirror image of the ram 32UR. To drive the ram 32UR, a rack 34UR on the bottom of the ram engages the top of a pinion 36R (see also FIGS. 12, 13 and 15).

The pinion 36R is connected by a shaft 37 to a similar pinion 36L on the opposite side of the magazine and to a drive gear 38 on the outside of the magazine. The gear 38 is hidden in a recess in the side of the magazine (see also FIG. 2) so that the gear cannot be manually tampered with or accidentally rotated. A groove 39 in the magazine sidewall extends from the gear 38 to the rear of the magazine to permit a pinion drive (to be described later) to engage the gear 38. This arrangement permits easy withdrawal and replacement of the magazine.

Figure 2:
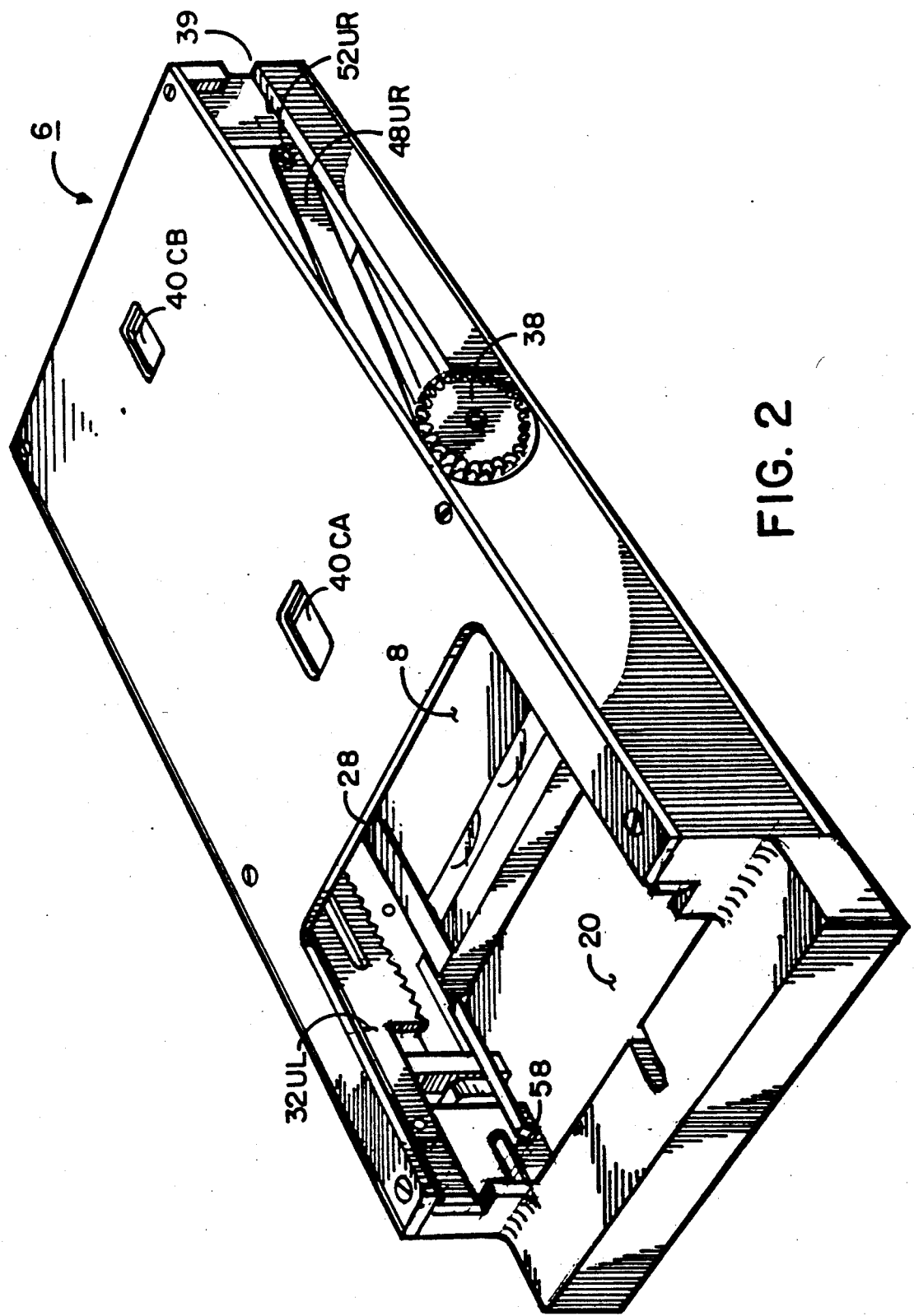
FIG. 2 is a perspective view of the cassette magazine after removal from the housing and tape drive with the cassettes removed.
Figure 3:
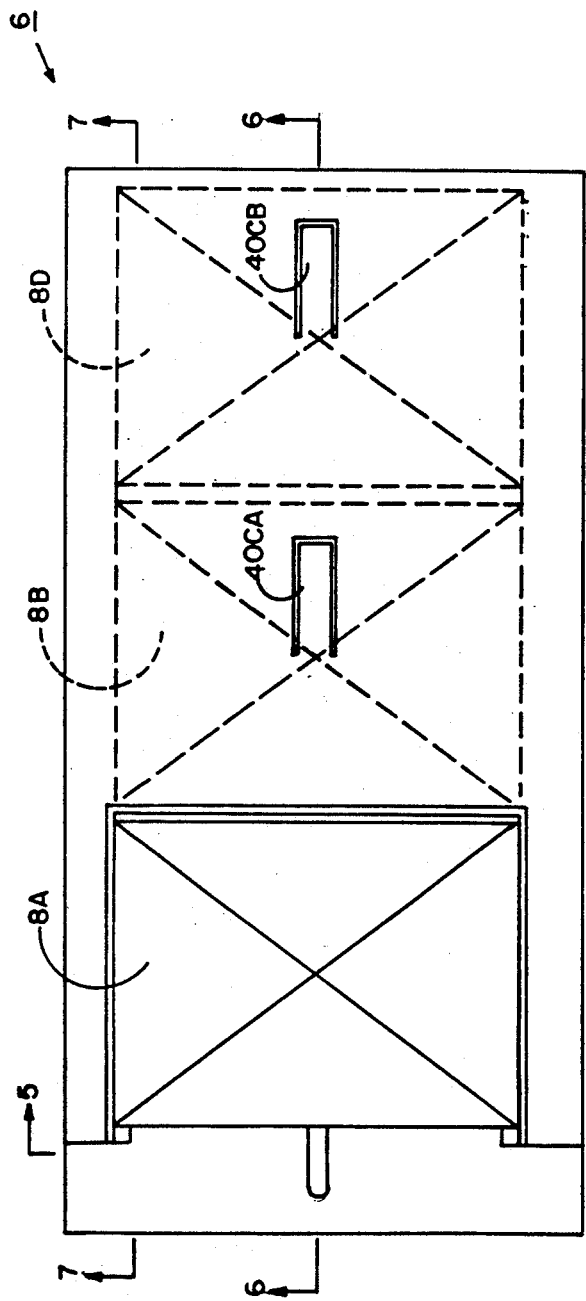
FIG. 3 is a top view of the magazine of FIG. 2.
Figure 4:
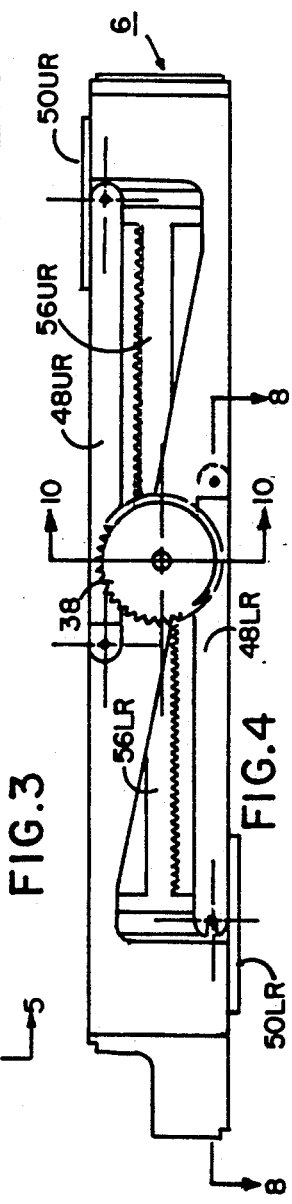
FIG. 4 is a view of the right side of the magazine of FIG. 2 with portions of the side wall removed to show the interior construction.
Figure 5:
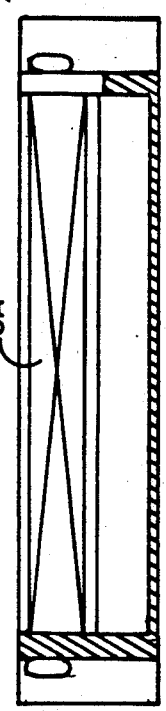
FIG. 5 is a section along line 5—5 of FIG. 3.
Figure 6:
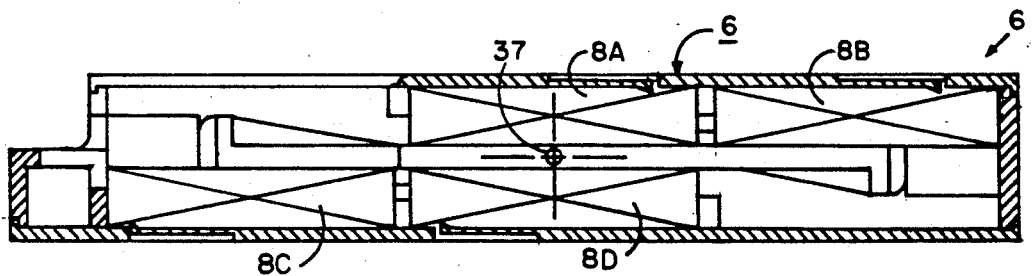
FIG. 6 is a cross section along line 6—6 of FIG. 3 with the cassettes on the upper deck advanced one position to the right and those on the lower deck one position to the left, which is the normal or "home" position of the cassettes when the magazine is removed from the tape drive.
Figure 7:
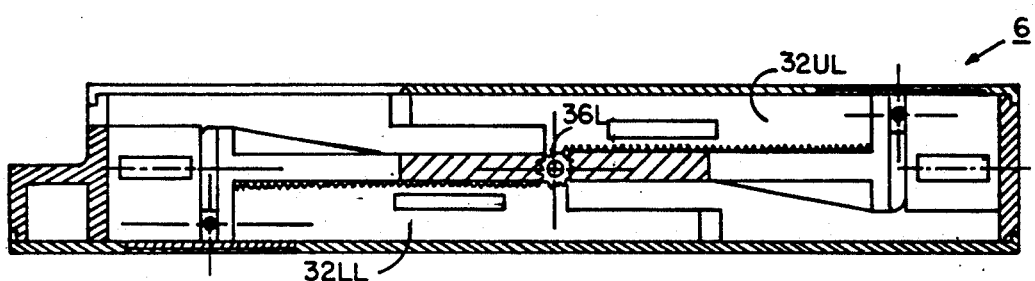
FIG. 7 is a cross section along line 7—7 of FIG. 3 with the tape cartridges removed.
Figure 14:
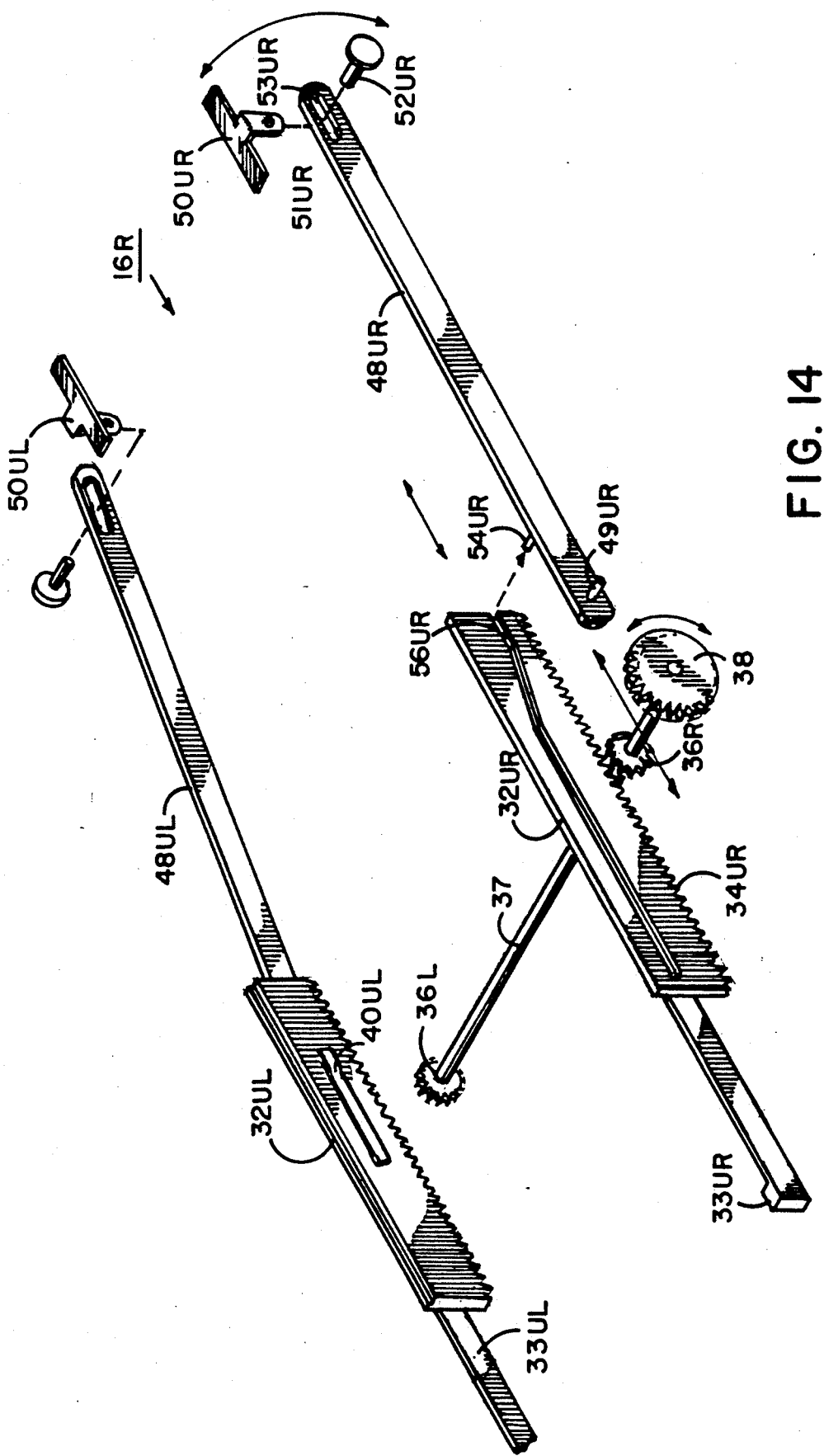
FIG. 14 is a partial perspective view illustrating the operation of the cassette transfer mechanism.
Figure 15:
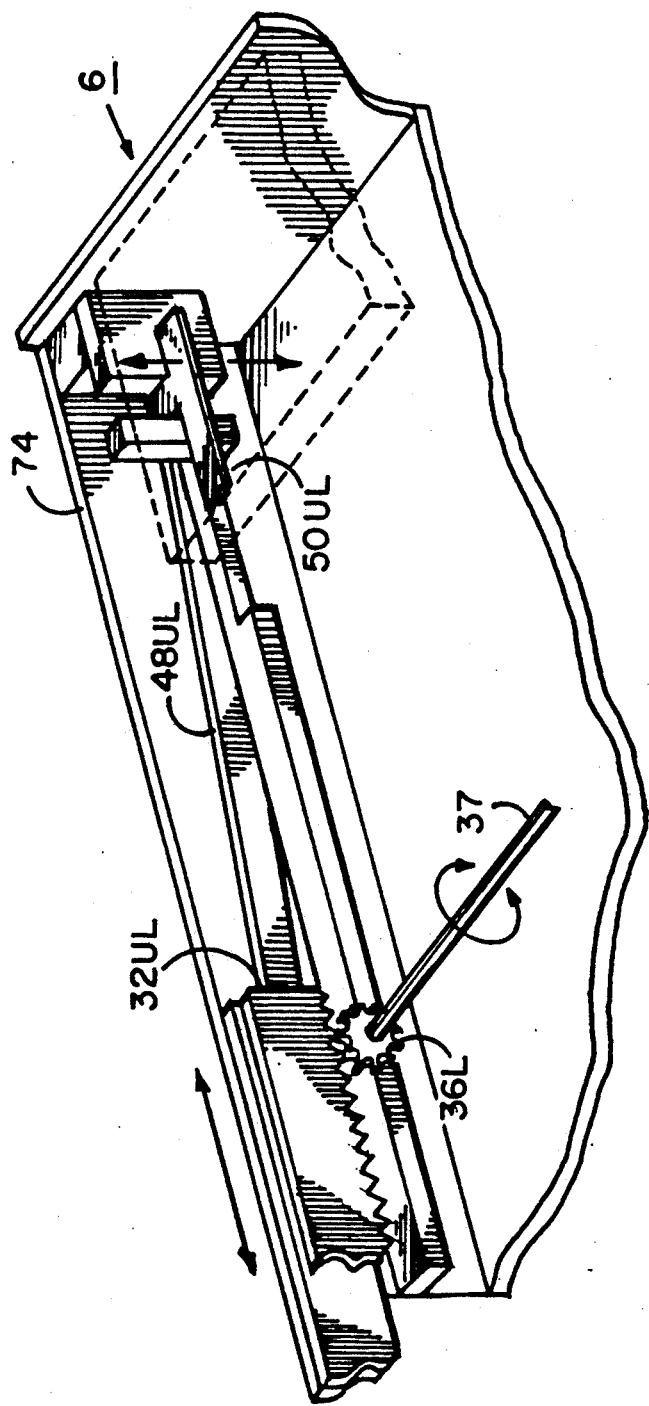
FIG. 15 is a partial perspective view illustrating the operation of the mechanism for transferring cassettes from the upper to the lower deck.

The gear 38 is driven in a clockwise direction, as viewed in FIGS. 2 and 14, to move the upper deck cassettes toward the rear of the magazine. During this movement, a spring loaded pawl 40UL in the side of the ram 32UL (FIG. 14) and a similar pawl 40UR (not visible in FIG. 14) in the inner surface of the ram 32UR engage the rear edge of the adjacent cassette. When the movement is completed, the drive is reversed and the rams 32UR and 32UL return toward the forward end of the magazine. The spring mounted pawls 40UL and 40UR pass freely over the cassette during the return stroke. Two additional pawls 40CA and 40CB (FIG. 3), formed by downwardly extending spring-mounted ears formed in the cover of the magazine 2, permit movement of the upper-deck cassettes toward the rear of the magazine, but prevent forward movement of the cassettes. The tabs 33UR and 33UL are also the spring mounted to allow the vertical transfer of the bottom front cassette into the pick-up position during the return stroke.

During the return stroke, one cassette on the upper deck is moved toward the rear end 16R of the magazine 6, and one cassette on the lower deck moves toward the forward end 16F. The cassette in the upper deck farthest to the rear is pushed downward into the vacant space on the lower deck and the forward cassette on the lower deck is forced upwardly into the pick-up position on the upper deck.

To force the upper cassette down to the lower deck, an arm 48UR (FIGS. 12-14) is pivotally mounted by a pin 49UR to the inner wall of the magazine housing. At the opposite end of the arm 48UR, a cassette push plate 50UR is secured to a slide 51UR that is mounted for vertical movement in a groove in the magazine housing. A pin 52UR engages a slot 53UR in the arm 48UR to secure the slide 51UR to the arm 48UR. The push plate 50UR is nested inside the top cover and rests on the top of the cassette on the upper deck nearest the end 16R.

To actuate the plate 50UR for vertical movement, a pin 54UR on the arm 48UR slidably engages a ramp groove 56UR in the side of the ram 32UR. During the movement of the ram 32UR toward the rear 16R of the magazine, the pin 54UR slides in a linear portion of the groove 56UR that is level with a fixed pin 49UR. The arm 48UR is thus maintained in a horizontal position during that motion of the ram, keeping the cassette push plate 50UR nested inside the top cover allowing the cassette to slide under it during the forward stroke.

Upon completion of the lateral movement of the cassettes and the return of the ram 32UR toward the forward end of the magazine, the pin 54UR engages a ramp portion of the groove 56UR that forces the pin 54UR downward causing the arm 48UR to pivot about the fixed pin 49UR. The plate 50UR pushed one end of the cassette downward to the lower deck.

An identical arrangement is provided on the opposite side of the magazine in which the arm 48UL carries a plate 50UL. The arm 48UL is actuated by an identical ramp groove 56UL and pin 54UL arrangement (not shown in FIG. 14) so that both arms 48UR and 48UL move downward at the same time to force the cassette into the lower deck.

Figure 12:
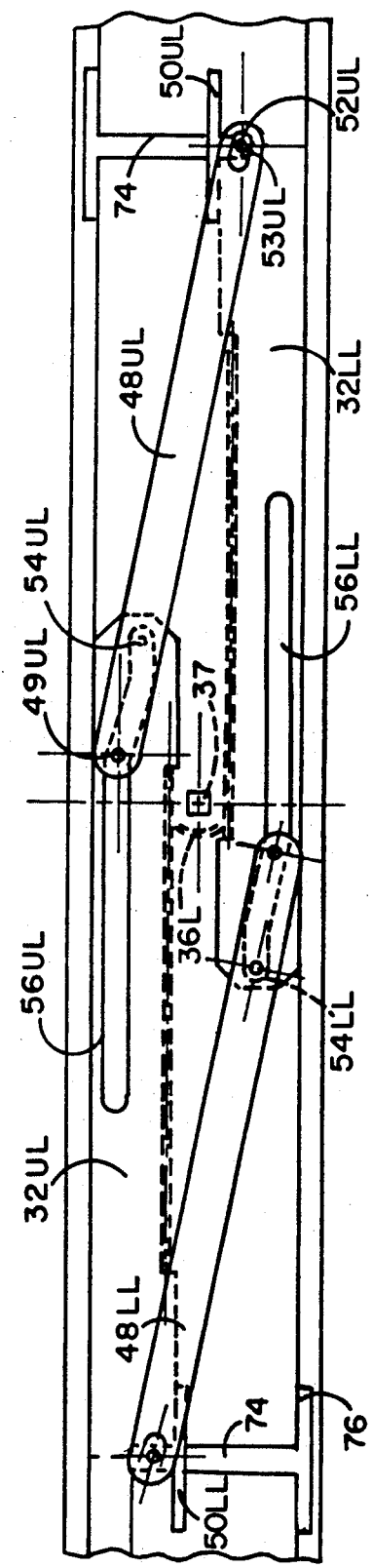
FIG. 12 is a schematic sectional view generally along line 6—6 of FIG. 3 with the cassettes removed and the cassette transfer mechanism at the maximum back stroke, the pick-up position for the front cassette.
Figure 13:
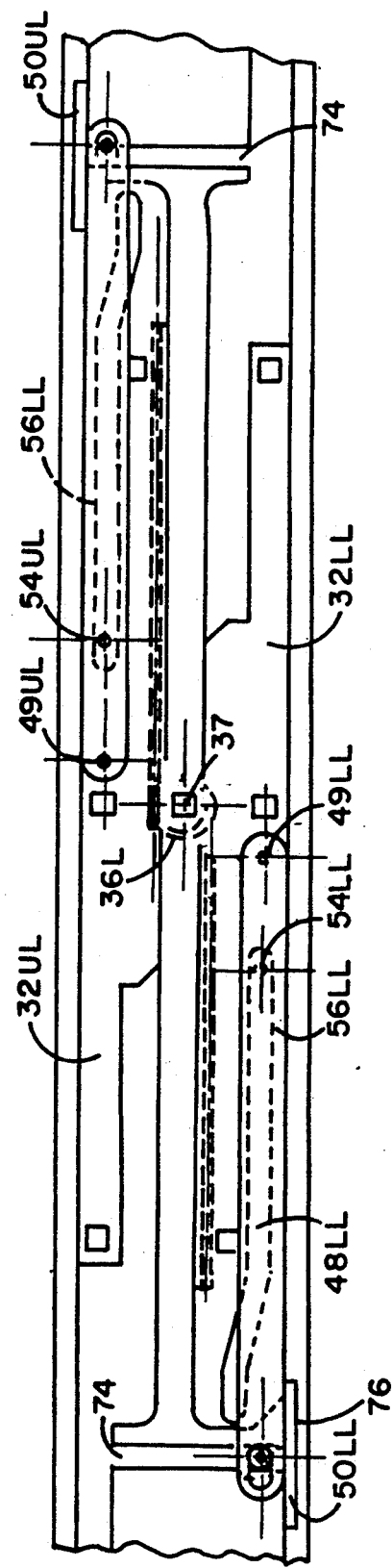
FIG. 13 is a schematic view similar to FIG. 12 with the upper and lower cassette transfer mechanism at the maximum forward stroke, the home position for the cassettes.

On the lower deck, the cassettes are transferred from the rear section 16R toward the front of the magazine. The basic operation is the same as just described in connection with the upper deck. FIGS. 12 and 13 show schematically the mechanism on the left side of the magazine 6 as viewed in FIG. 2.

Figure 8:
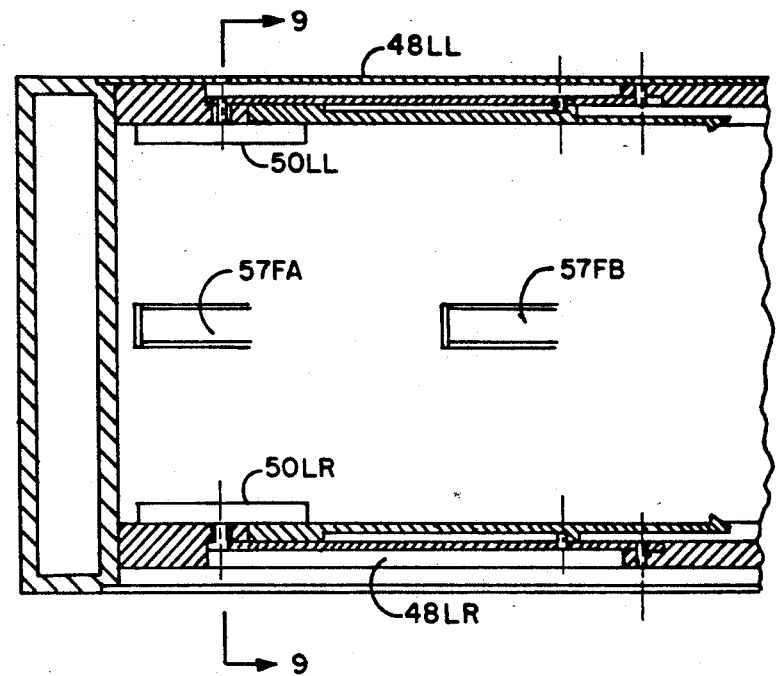
FIG. 8 is a partial cross section along line 8—8 of FIG. 4.
Figure 29:
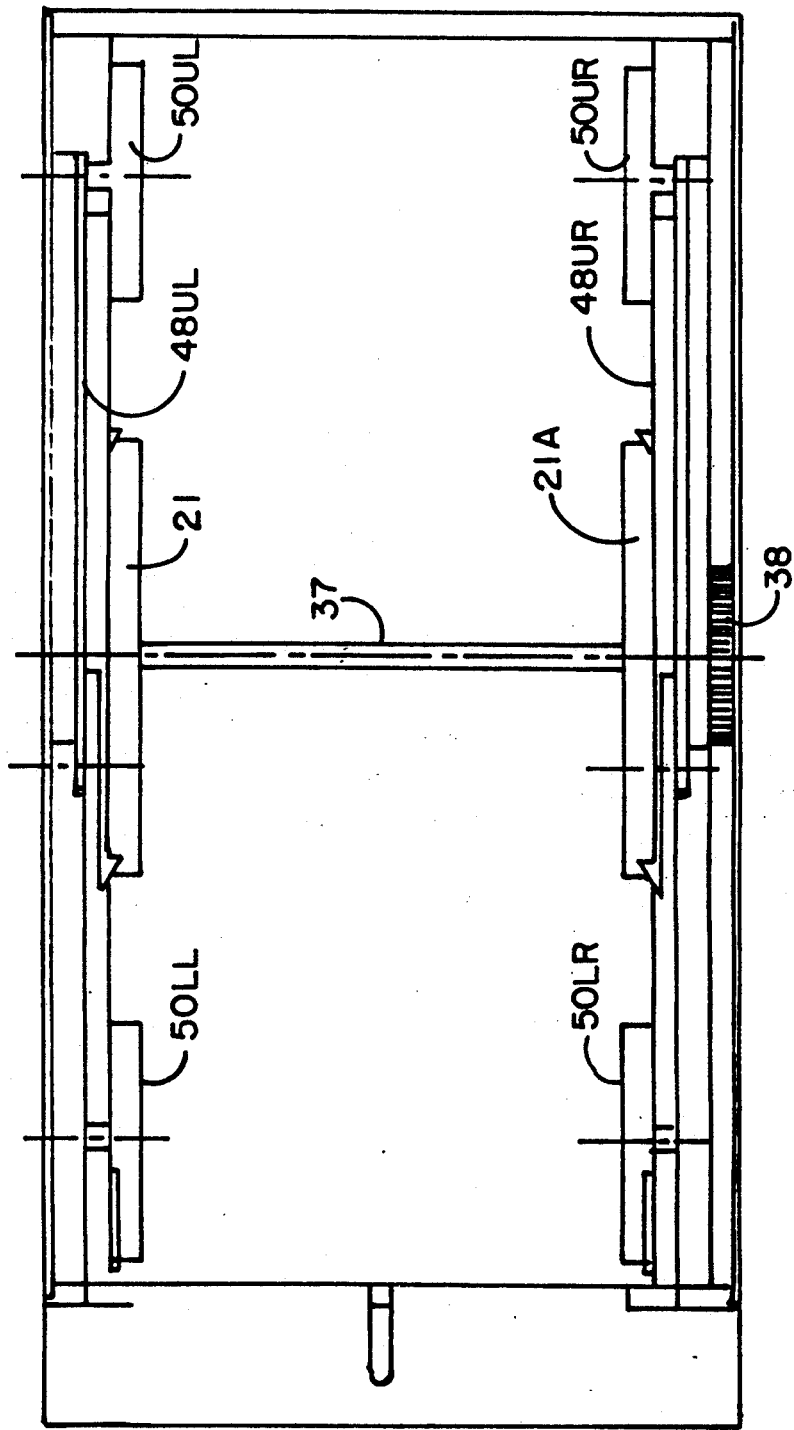
FIG. 29 is a top view of the bottom cover of the magazine with the cassettes removed.
Figure 35:
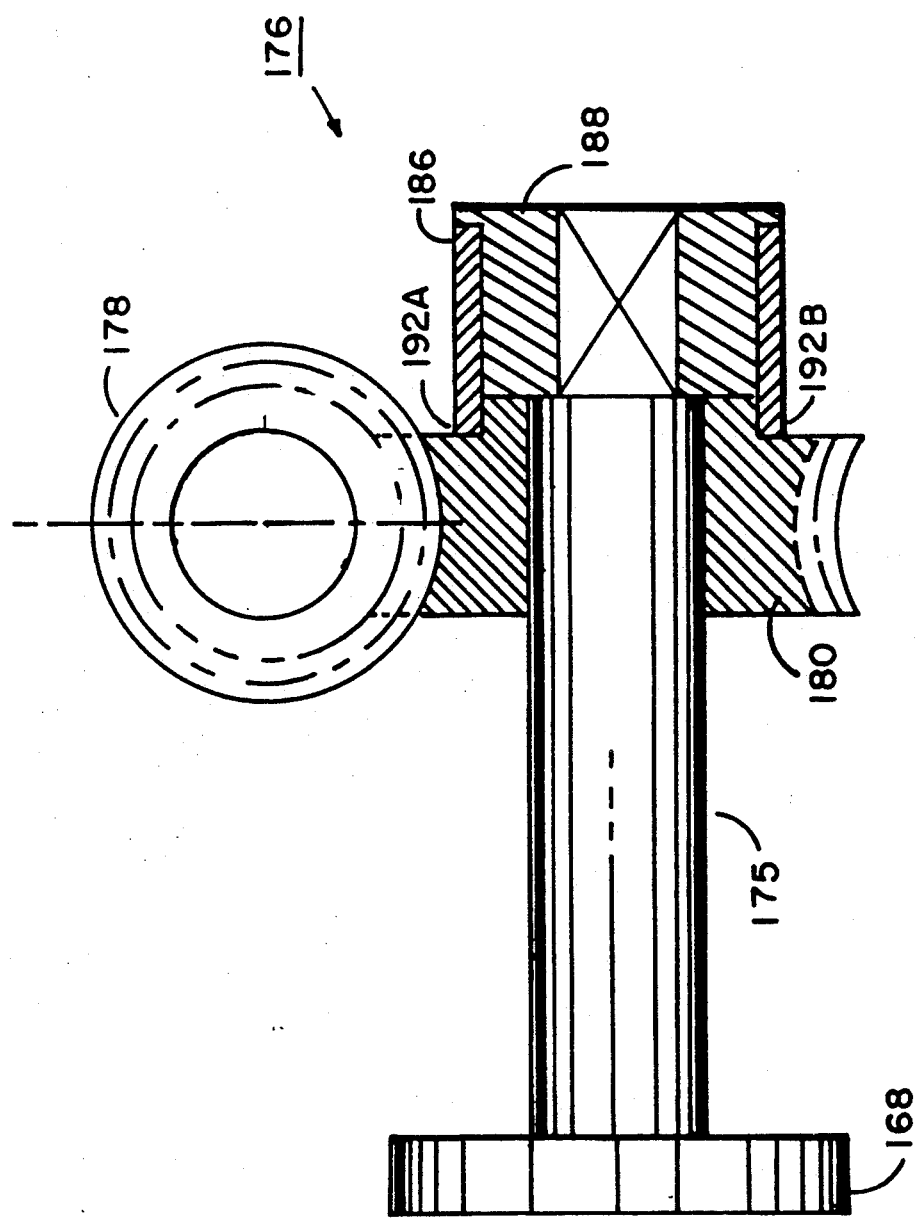
FIG. 35 is a partial sectional view illustrating the slip clutch for use in both the cassette drive mechanism and in the motion control of the gripper.

In FIG. 13, the ram 32LL (and the opposite ram 32LR, (now shown in this view) are at the far front position having moved the lower deck cassettes to the front of the magazine. The ram 32LL is driven by the same rack and pinion arrangement as in the upper deck except the racks are on the upper edge and engage the lower sides of the pinions 36R and 36L (See also FIG. 14). When the drive shaft 37 is driven in a counter clockwise direction, the ram 32LL is driven toward the rear of the magazine, while the cassettes are prevented from mvoing by resilient pwals 57FA and 57FB (see FIG. 8, not shown in FIG. 29) formed in the floor of the magazine and extending upward into the path of the lower-deck cassettes. These pawls have a sloping upper surface so that the pawls are deflected permit the cassettes to slide over them when moving toward the front of the magazine, but preventing movement of the cassettes in the opposite direction.

As the ram 32LL moves toward the rear of the magazine, the pin 54LL extending from the arm 48LL rides in a linear portion of the ramp groove 56LL in the ram 32LL. Since the linear portion of the groove 56LL is in horizontal alignment with the fixed pivot pin 49LL, the arm 48LL remains horizontal until the ramp portion of the groove 56LL, reaches the pin 54LL at which time the pin 54LL is forced upwardly to pivot the arm 48LL about the fixed pin 49LL to the position shown in FIG. 12.

As described previously, in connection with the arm 48UR (see also FIG. 29), the arm 48LL carries a push plate 50LL that, in cooperation with an identical lift arrangement on the opposite side of the magazine, forces the cassette upward into the pick-up position on the upper deck. The push plate 50LL and the opposite one 50LR are brought quickly back to nesting in recesses 76 in the floor of the magazine to allow the newly arriving cassette to slide over them without interference. The guiding slots 74 in each side of the magazine maintain the sliding motion of the push plates 50LL and 50LR straight up and down during the cassette transfer (see also FIG. 15).

When a cassette has been transferred into the pick-up position and the push plates 50LL and 50LR have been lowered to the bottom of the magazine, it is necessary to support the cassette in the pick-up position. For this purpose, two elongated cylindrical pawls 58 are positioned in slots in opposite walls of the magazine. The pawl 58, as shown in FIG. 2, and an opposing pawl (not shown) in the opposite wall of the magazine 6 are spring biased inwardly so that the cassette can be easily pushed upward over the pawls by the push plates 50LL and 50LR, forcing the pawls inwardly into the retaining slots. The pawls provide sufficient support to prevent the cassette from dropping back to the lower deck.

At the rear of the magazine 6, two similar pawls (now shown), similarly biased by springs, prevent a cassette on the upper deck at the rear of the magazine from falling by its own weight to the lower deck.

Because the cassettes are at all times secured within the magazine, the magazine may be operated in any position and it is not necessary to have a full complement of cassettes: the transfer functions can be performed with only one cassette in the magazine.

Figure 26:
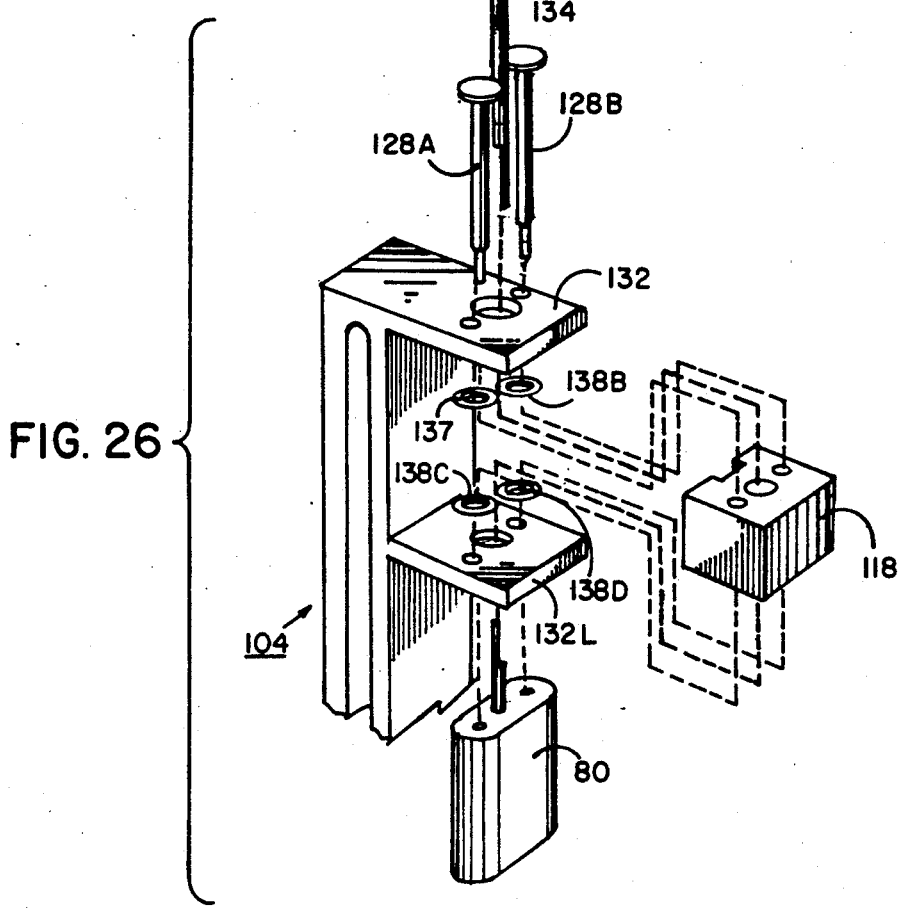
FIG. 26 is an exploded perspective view illustrating parts of the mechanism for opening and closing the cassette gripper.
Figure 27:
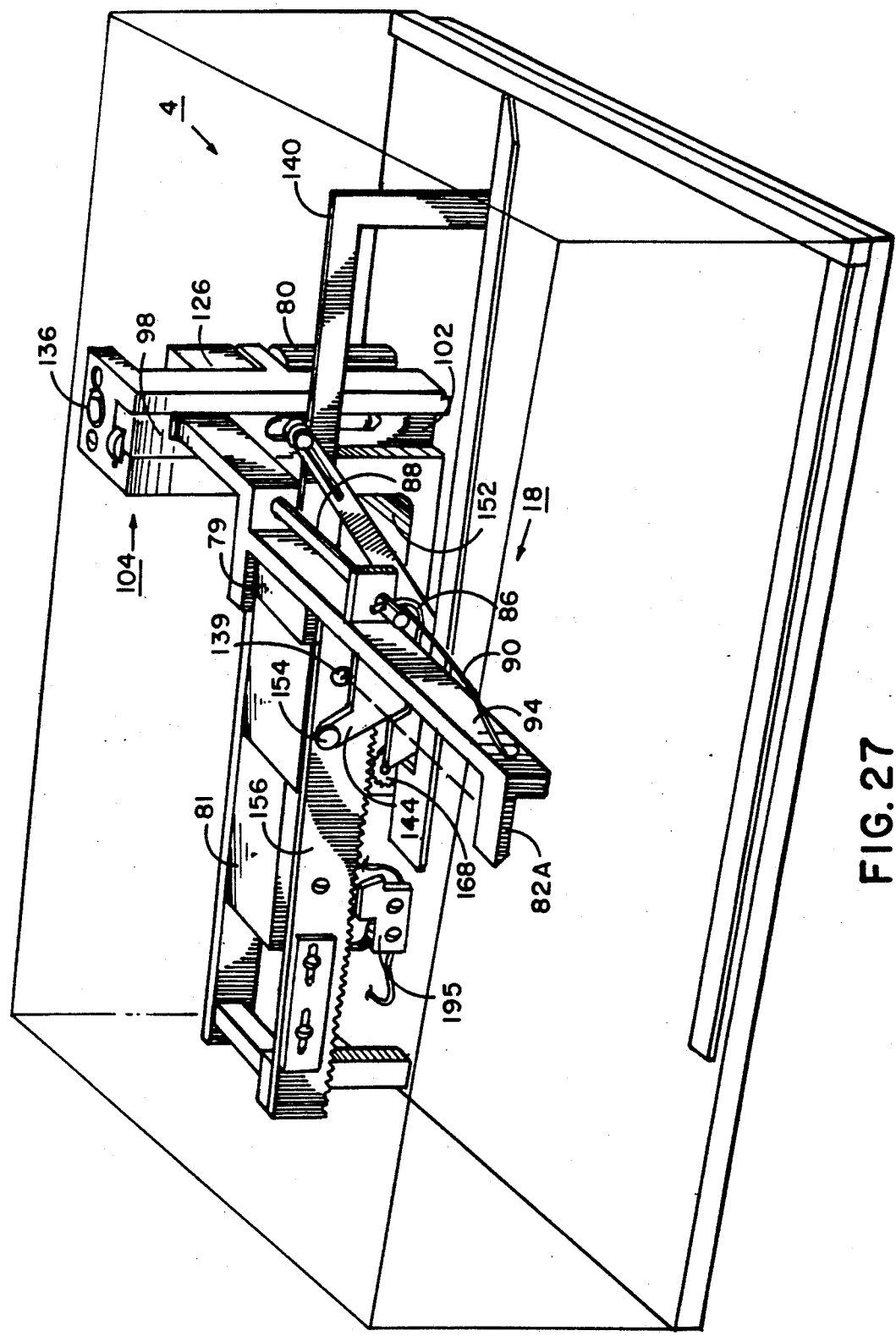
FIG. 27 is a partial perspective view showing the cassette gripper transport mechanism.

There are three separate electric motors to actuate the robotic motions. The horizontal and vertical transfer of the cassettes 8 within the magazine 6 is powered by an electric motor 79 (FIG. 27); the gripper 18 is opened and closed by an electric motor 80 (FIGS. 26 and 27); and the gripper 18 is transferred between the pick-up position in the magazine 6 and the entrance to the tape drive 2 by a motor 81 (FIG. 27).

FIGS. 16 through 25 show details of the robotic mechanism that transports the cassettes between the pick-up position of the magazine 6 and the entrance position of the tape drive 2. For purposes of simplifying the explanation, the magazine has been omitted from these figures and the cassettes 8 are represented by broken lines. The cassette gripper 18 consists of two rigid upper ears 82A and 82B (see FIGS. 16, 27 and 29), that engage the upper surface of the cassette at two spaced contact points, and a rotatable stiff wire spring finger 86 that engages the lower surface of the cassette near the rear edge. The finger 86, which is biased by a spring member 90 (FIG. 27) toward its open position, is secured to an actuating shaft 88 supported by a bearing 92 (FIG. 34) integral with a supporting cantilever arm 94.

The finger 86 presses upwardly against the undersurface of the cassette and forces it upwardly against the ears 82A and 82B. These ears fit closely against the surface of the cassette and the finger 86 is adjacent the very rear edge of the cassette allowing the cassette to be placed far enough into the tape deck opening to accommodate the cassette handling mechanisms of the various tape deck designs.

It is important that the cassette, which may contain valuable information, be prevented from being damaged even in the event of a malfunction of the mechanisms. If an object strikes the cassette while it is being gripped, the flexing of the spring biased finger 86 will permit the cassette to be removed from the gripper without damage to the cassette.

It is important that the gripper finger 86 to be maintained in either the open or the closed position during the transport cycle between the tape drive 2 and the magazine 6. This is achieved with minimum power requirement by using a cam/lead screw arrangement illustrted by FIGS. 21, 22, 27, and 29-33. The arm 94 is supported by a slide bar 98 (FIG. 27) that is slidably mounted in a vertical slot 102 in a stanchion, generally indicated at 104, that is itself mounted for horizontal movement along a track 106 (FIG. 30) secured to the base of the housing 4 (FIG. 1). The shaft 88 extends beyond the slide bar 98 (FIG. 27) through a vertical slot in the stanchion 104 into a generally U-shaped recess in a control member 110 (FIGS. 30 and 33) that is positioned for horizontal sliding motion in a transverse opening, indicated at 112, in the stanchion 104. An arm 114 carrying a roller 116 (FIG. 21) is mounted on the end of the shaft 88 so that the roller 116 rides on one wall 115 (see also FIG. 33) of the U-shaped recess in the control member 110.

Figure 21:
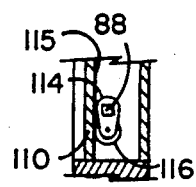
FIG. 21 is a partial cross section along line 21—21 of FIG. 19 with the cassette gripper in its closed position.
Figure 22:
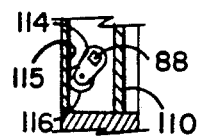
FIG. 22 is a partial cross section along line 21—21 of FIG. 19 with the cassette gripper in its open position.
Figure 23:
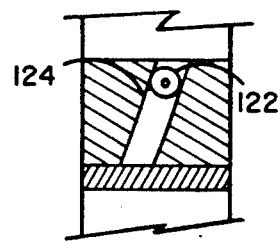
FIG. 23 is a partial cross section along line 23—23 of FIG. 19 with the cassette gripper in its closed position.
Figure 24:
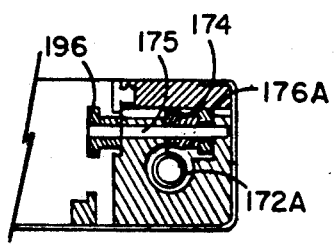
FIG. 24 is a partial cross section along line 24—24 of FIG. 16.
Figure 25:
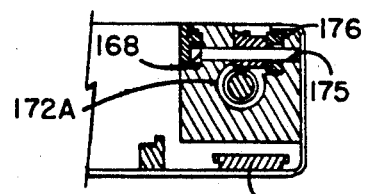
FIG. 25 is a partial cross section along line 25—25 of FIG. 16.

FIG. 21 illustrates the position of the arm 114 when the gripper finger 86 is in its closed position. When the control arm 94 and the control member 110 move vertically to raise and lower the cassette, the roller 116 rolls along the wall 115 of the U-shaped recess in the control member 110 to maintain the gripper in closed position. When the control member 110 is moved to the left, as viewed in FIG. 21, by means to be described later, the arm 114 rotates clockwise, as shown in FIG. 22, driven by the spring 90, causing the the finger 86 to open and release the cassette. Again, as the cantilever arm 94 and the control member 110 are moved vertically, the roller 116 rides on the recess wall 115 of the control member 110 and the open position of the gripper finger 86 is unaffected.

To retain the control member 110 in a vertical position while it is moved horizontally to open and close the gripper, a number of laterally displaced ball bearings 118 (FIG. 33) are positioned between the upper and lower ends of the control member 110 and the adjacent surfaces of the transverse opening 112 in the stanchion 104.

To drive the control member 110 horizontally to open and close the gripper, a roller 122 is mounted on the end of a short shaft 123 (FIG. 30) extending from the rear surface of the control member 110 through a horizontal slot. The roller 122 is positioned in a slot 124 in the surface of a lead nut 126. The slot 124 extends at an angle from the vertical (FIG. 32) so that as the nut 126 moves vertically the control member 110 is shifted horizontally.

The nut 126 is supported for vertical movement by a pair of support rods 128A and 128B (FIGS. 26 and 31) that extend between two platforms 132U and 132L formed integrally with the stanchion 104. A lead screw 134 in threaded engagement with the nut 126 extends from a bearing 136 in the platform 132U through an opening in the platform 132L and is connected to the drive shaft of the motor 80 that is secured to the platform 132L on the stanchion 104.

With this arrangement, the cassette gripper 18 can be lowered to engage a cassette in the pick-up position in the magazine 6. The motor 80 then drives the lead screw 134 to lift the nut 126 vertically upward forcing the control member 110 to move sideways to the position shown in FIG. 21 closing the gripper finger 86 on the cassette. The control member 110 may then be lifted vertically to raise the cassette to the level of the entrance position 15 of the tape drive 2. The cassette remains firmly gripped during this vertical transition.

To avoid the need for sensitive limit switches or other mechanisms, the nut 126 merely strikes the upper platform 132U at the top of the movement or the platform 132L at the bottom of the stroke. When further movement of the nut 126 is prevented by either of the abutments, the load on the motor 80 is increased and the current drawn by the motor increases accordingly. This increase in motor current is sensed by known circuit means (not shown) to interrupt the power to the motor.

However, it is important to prevent jamming of the lead screw at the end of the stroke. For this reason, it is desirable to provide a means for storing a small amount of the energy of the drive system at each end of the stroke. This may be accomplished by a spring arrangement, such as that illustrated in the earlier co-pending application Ser. No. 07/555,576. In this example, a simple and effective energy-storage mechanism is provided by two resilient plastic O-rings 138A and 138B surrounding, respectively, the upper portions of the vertical support rods 128A and 128B. To absorb the energy at the end of the downward movement of the nut 126, two similar O-rings 138C and 138D are positioned around the lower portions of the support rods 128A and 128B between the nut 126 and the lower motion limiting platform 132L.

When the tape drive 2 ejects a cassette to the gripper 18 at the entrance position, the presence of the cassette is sensed by a conventional beam sensor, indicated diagrammatically at 139 in FIG. 27. When the sensor 139 is activated, the gripper 18 closes upon the cassette and transports it the pick-up position of the magazine 6. In moving from the entrance position to the pick-up position in the magazine, the gripper arm 94 follows an L-shaped path in which the cassette is moved horizontally away from the tape drive 2 and then vertically downward to the pick-up position. Conversely, in transferring a cassette from the pick-up position in the magazine, the gripper arm 94 moves vertically upward and then horizontally to the entrance position.

To move the cassette gripper horizontally, the stanchion 104, including the motor 80 and the gripper opening and closing mechanism, are moved horizontally. An L-shaped guiding track 140 (FIGS. 27 and 28) guides the cassette gripper arm 94 along its vertical and horizontal paths without possibility of failure.

Figure 28:
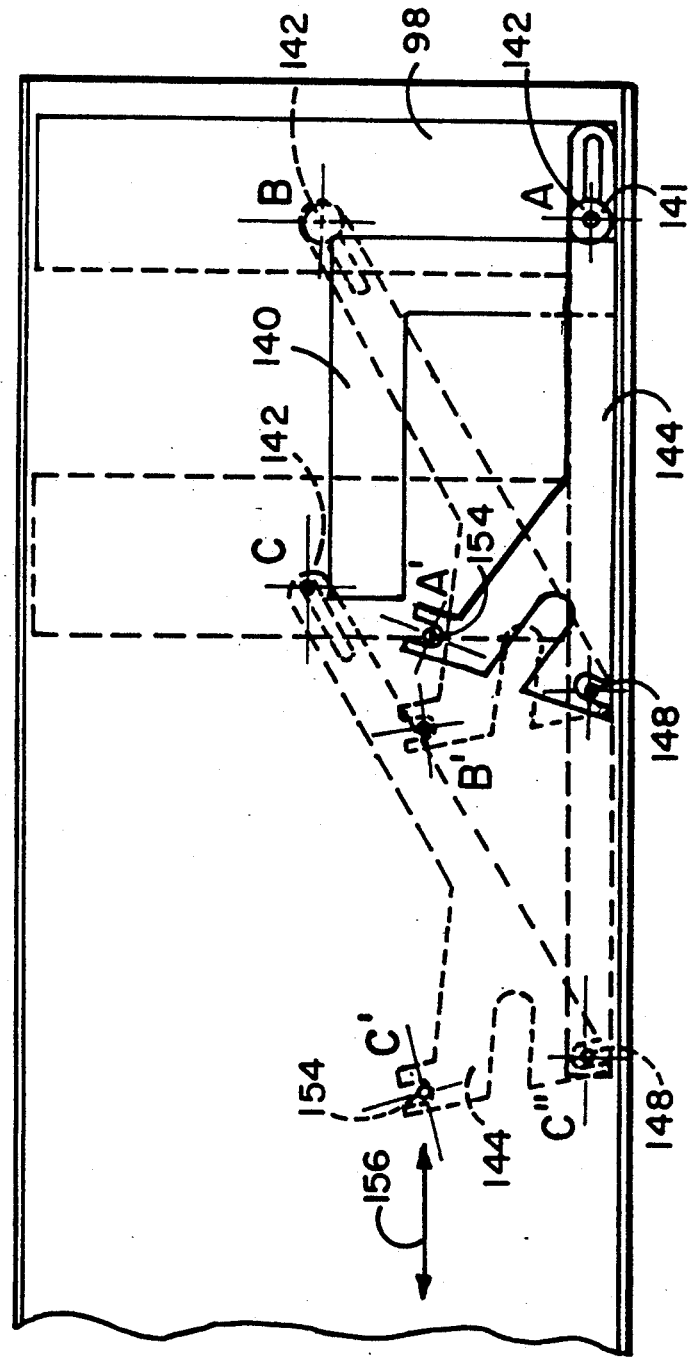
FIG. 28 is a partial diagrammatic view illustrating the direction control mechanism for transporting the cassette gripper.

As illustrated by FIG. 28, a roller 141 rotates on a stud 142 that is secured to the slide bar 98 (diagrammatically illustrated in FIG. 27) that is integral with the cantilever gripper arm 94 and slides vertically up and down inside the stanchion 104. For proper operation, the stud 142, and the roller 141 must move vertically from the position indicated at A in FIG. 28 to the position indicated at B, then horizontally from position B to position C, carrying with it the slide bar 98 and gripper arm 94.

This motion is produced by a rigid 3-point lever 144 that is mounted on three triangularly positioned connection points for horizontal and rotary movement. One of the three point connections is made by the stud 142 and roller 141 to the slide bar 98 near its base. The roller 142 rides along the edge of an L-shaped guide track 140. At a second one of the three point connections the lever 144 is pivotally connected by a stud 148 to a base 152 that forms an integral part of the stanchion 104 and is slidably mounted on the track 106 (FIG. 30). The connection point at the stud 148 is restricted to horizontal movement. The third of the three point connections is pivotally connected by a stud 154 to a driving ram 156 shown in FIG. 27 and indicated diagrammatically by the horizontal line 156 in FIG. 28.

When the ram 156 is in its maximum forward position moving the connection stud 154 toward the right as viewed in FIG. 28, the stud 154 is in position A', and the stud 142 and the roller 141 are in the position A. At this point the cassette gripper 18 will be at the pick-up position in the magazine 6. Backward movement of the ram 156 (toward the left in FIG. 28) will move the stud 154 to the position B'. To prevent the lever 144 from moving backward with the ram 156, a vertical section of the L-shaped track 140 forces the roller 141 to move vertically to the top of the track 140 carrying with it the slide bar 98 and the gripper arm 18. At that point, the roller 141 is free to move horizontally on the track 140 pulled by the stud 154 that is moving back to position C'. The lever 144 and the stud 148 are also moving backward to the position indicated at C''. This is the maximum backward position with the gripper 18 at the tape drive entrance position 15 or, as will be explained later, slightly to the left of the entrance position 15 as viewed in FIG. 27 and to the right of it as viewed in FIG. 1. Reverse motion of the ram 156 will move the stud 154 from position C' to B' while the roller 141 is rolling horizontally on the track 146 until it reaches the position B. It is then free to drop vertically down to position A. The slide bar 98 and the gripper arm 18 are moved so that the gripper is in the pick-up position in the magazine 6. The track 146 is a simple piece of flat sheet metal positioned to guide the path of the roller 141.

The horizontal movement of the ram, 156 is provided by the electric motor 81 through a pinion 168 (FIGS. 16, 17, 24 and 27) driven by a conventional worm gear arrangement generally indicated at 172A (FIG. 25) that drives a rack on the bottom of the ram 156. With this arrangement, a gear 174 is connected to an output shaft 175 through a slip clutch, generally indicated at 176 in FIG. 25, that limits the maximum torque applied to the pinion 168. This allows the stroke of the ram 156 to be limited by hard stops while eliminating the possibility of mechanical damage. As described previously, the drive is actuated in one direction and continues until the ram 156 is blocked from further movement. The increased load on the motor 81 increases the current through the motor and this increase actuates an electronic circuit of conventional type (not shown) that interrupts the current to the motor.

Figure 36:
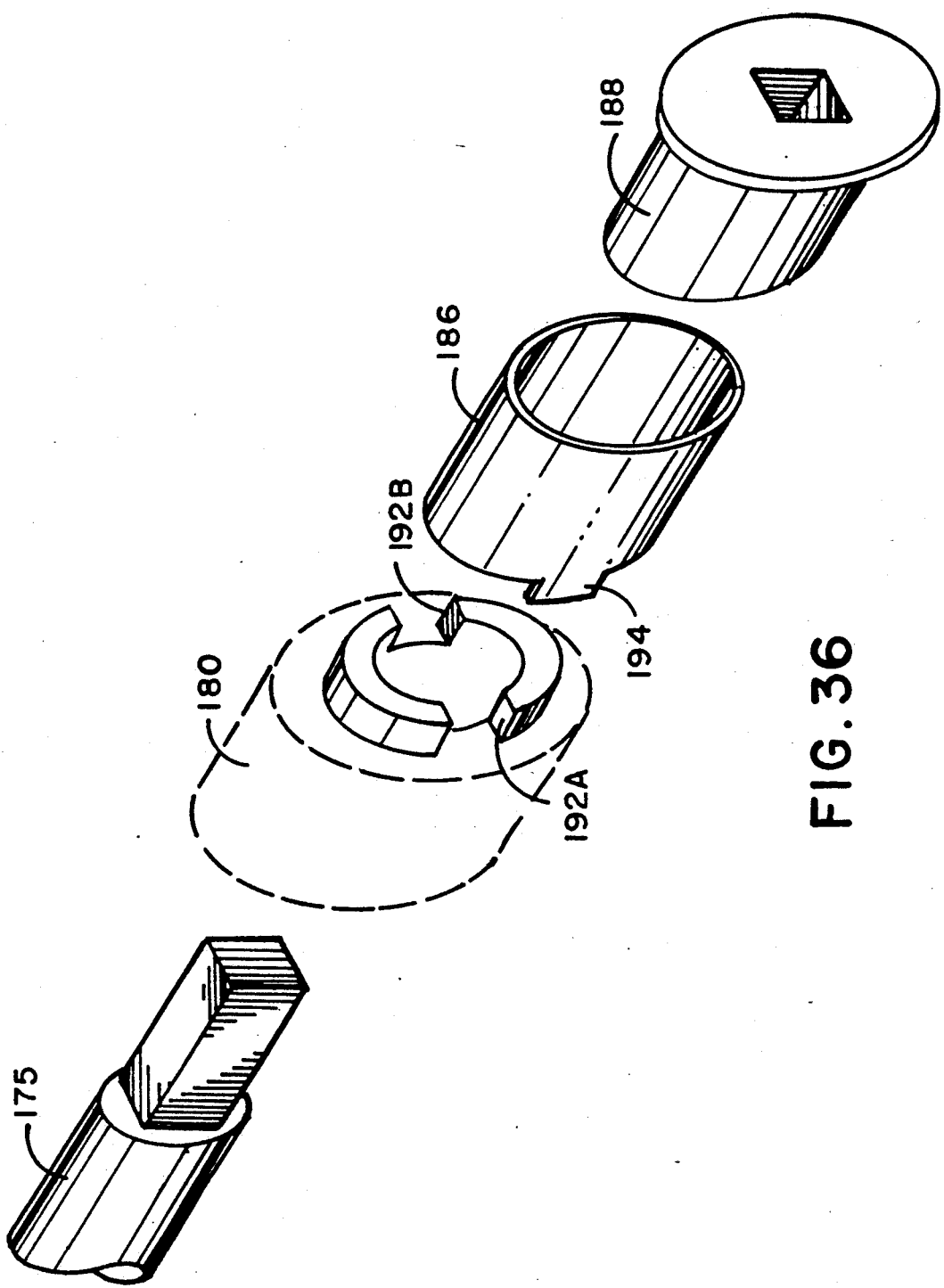
FIG. 36 is an exploded perspective view illustrating details of the slip clutch of FIG. 34.
Figure 40:
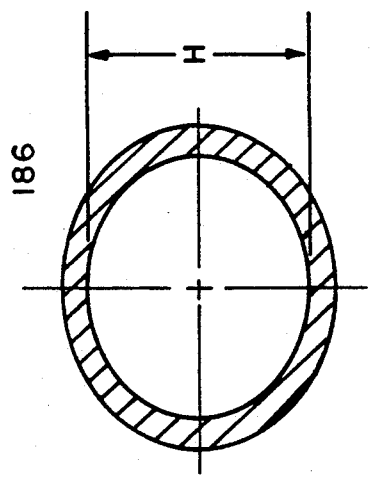
FIG. 40 is an exaggerated view of the flexible sleeve after the preassembly deformation.
Figure 39:
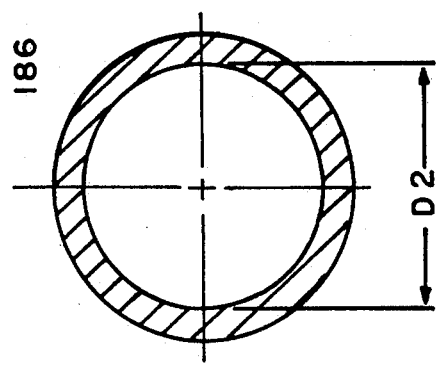
FIG. 39 is a cross section of the flexible sleeve before deformation.
Figure 38:
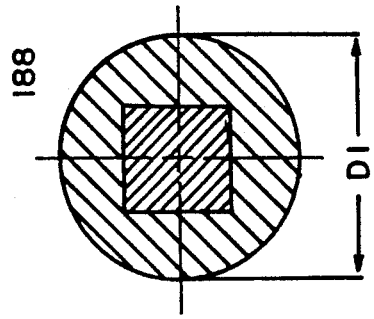
FIG. 38 is a cross section of the bushing.
Figure 37:
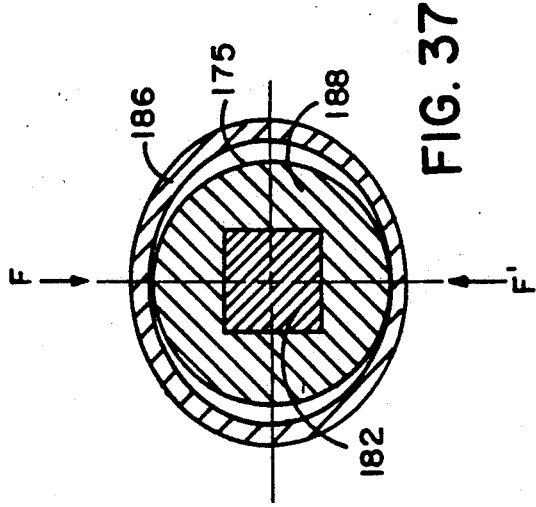
FIG. 37 is a cross section of the assembled slip clutch showing the bushing and flexible sleeve.

The details of the slip clutch 176 are shown in FIGS. 35-40. A worm 178, driven by the motor 81 drives a worm gear 180 that is mounted to rotate freely on an output shaft 175 connected to the ram drive pinion 168. A flexible sleeve 186 is rotatably mounted on a bushing 188 that is keyed to the output shaft 175. The worm gear 180 engages and drives the flexible sleeve 186 by means of two notches 192A and 192B and engaging tabs 194 (only one of which is shown in FIG. 36).

The flexible sleeve 186 (FIG. 39) is formed initially with an inner diameter D2 that is slightly larger than the outside diameter D1 of the bushing 188 (FIG. 38), that is, the diameter of the sleeve is such that if it were perfectly round there would be negligible friction between the sleeve and the bushing 188. Prior to assembly, however, the flexible sleeve 186 is permanently deformed, as by flattening to form a generally oval shape, so that opposite points on the perimeter are pressed inwardly so that the smallest diameter H (FIG. 40) is significantly, but only slightly, less than the Diameter D1 of the bushing 188.

The flexible sleeve 186 is formed of beryllium bronze, stainless steel or other spring type metal. The bushing 188 is preferably formed of a wear resistant plastic such as nylon. When the unit is assembled, the flexible sleeve 186 exerts on the bushing two opposite and equal forces, indicated at F and F' in FIG. 37. The application of these forces produces a frictional contact between the two surfaces that allows a torque to be transmitted between the flexible sleeve 186 and the bushing 188. The magnitude of the maximum torque that can be transmitted is a function of the magnitude of the forces F and F'. The magnitude of the forces depends, among other factors, on materials, size, and the degree of deformation imparted to the flexible sleeve prior to its assembly on the bushing 188. When the torque reaches its maximum value, slippage occurs between the sleeve 186 and the bushing 188 thus preventing an excessive torque from being transmitted.

When wear begins to occur between the sliding surfaces of the clutch, the spring rate of the material that forms the flexible sleeve will maintain the forces F and F' at a near constant value to provide a relatively stable maximum torque transmission. Once the specific materials to be used in the construction have been defined, the torque transmission level can be set simply by controlling the degree of deformation of the flexible sleeve 186. Once set, the slip clutch needs no further adjustment and is relatively tamper proof.

In operation, when the ram 156 moves toward the right as viewed in FIG. 27, the cassette gripper 18 transfers the cassette in its grasp to the pick-up position in the magazine 6. This motion is mechanically limited when the slide bar 98 that is integral with the gripper arm 94 strikes the base of the housing 4. As explained above, the increased drive resistance, as determined by the slip clutch 176, causes the current through the motor 81 to increase actuating the electronic controls (not shown) to interrupt the current to the motor.

When the motor 81 is operated in the opposite direction, the gripper 18 transfers the cassette from the pick-up position in the magazine to the entrance position 15. At this point, the rear end of the drive ram 156 (FIG. 27) closes a switch 195 that opens the gripper 18. The gripper remains open as the ram 156 continues to move toward the left as viewed in FIG. 27. The gripper 18 inserts the cassette into the tape drive 2 until the stanchion 104 strikes an abutment causing the current to the motor 81 to be interrupted. At this point, the cassette is "swallowed" by the tape drive mechanism 2. The motor 81 is then actuated to reverse the motor 81 and move the gripper away from the tape drive 2 until the switch 195 is opened by movement of the ram 156 and disconnects the motor 81. The switch 195 is mechanically positioned in the path of the ram 156 at a point that will cause the gripper 18 to open during the motion of the gripper toward the tape drive 2 before "swallowing" of the cassette by the tape drive mechanism occurs. The switch 195 stops the return movement of the gripper at a point where the cassette will be positioned to receive a cassette ejected from the tape drive. The gripper remains in this position until the sensor 139 indicates that a cassette has been ejected by the tape drive 2. The gripper arm 18 is then closed and the cassette is transferred to the pick-up position in the magazine 6.

Figure 16:
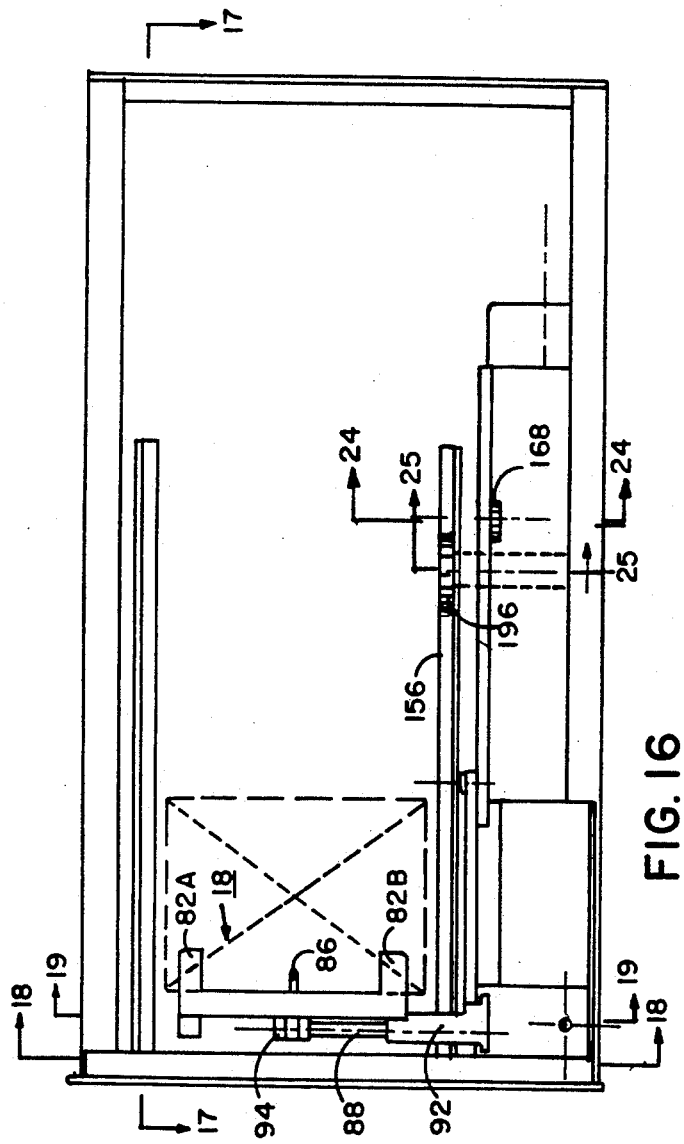
FIG. 16 is a top view similar to FIG. 1 with the magazine and tape drive mechanism removed.
Figure 17:
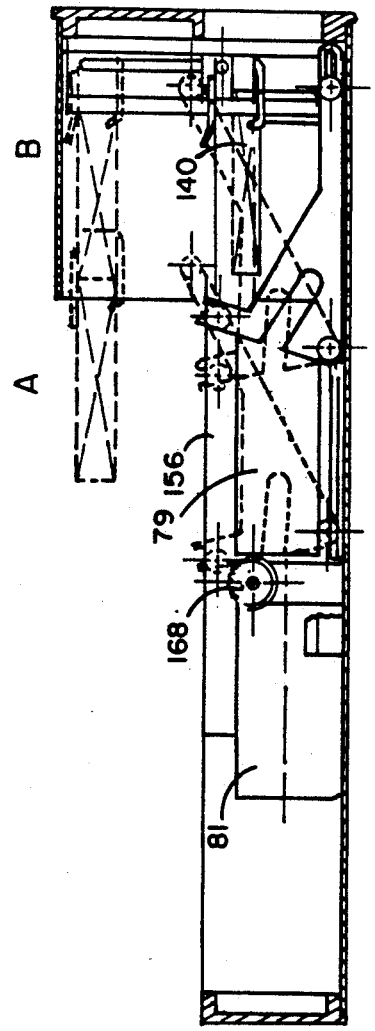
FIG. 17 is a cross section along line 17—17 of FIG. 16.
Figure 19:
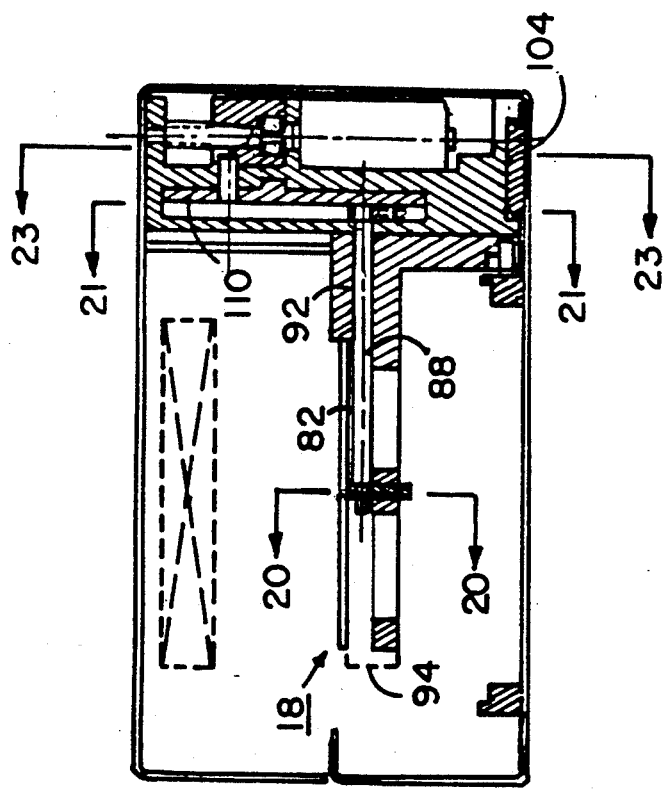
FIG. 19 is a cross section along line 19—19 of FIG. 16.
Figure 18:
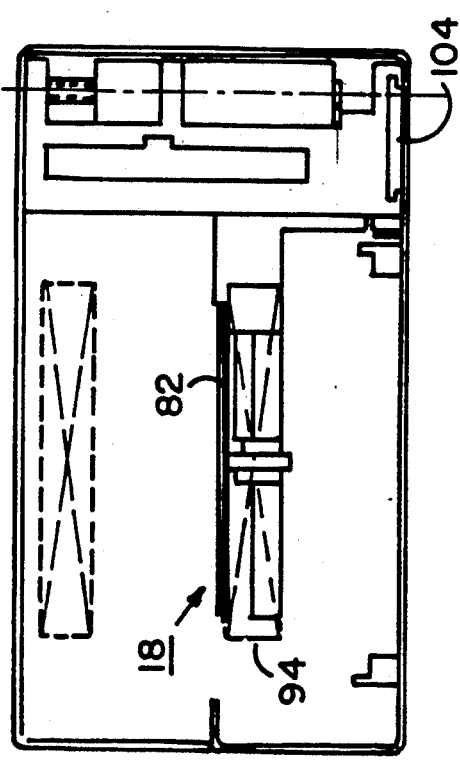
FIG. 18 is a cross section along line 18—18 of FIG. 16.
Figure 20:
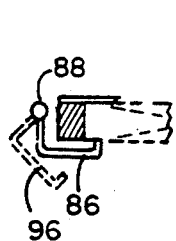
FIG. 20 is a cross section along line 20—20 of FIG. 19.

Power for transferring the cassettes within the magazine is provided by the motor 79 which is coupled through a worm gear arrangement, generally indicated at 172A (FIG. 24) to a magazine drive pinion 196 (see also FIG. 16). The worm gear drive arrangement may be identical with the worm gear arrangement 172. A slip clutch, generally indicated at 176A, is included in the drive train and is identical to the slip clutch 176, already described.

The pinion 196 is positioned so that when the magazine 6 is inserted into the housing 4, the pinion passes along the groove 39 in the wall of the magazine and, when the magazine is fully inserted, engages the drive gear 38 on the side of the magazine.

I claim:

1. Apparatus for storing and manipulating cassettes having a magazine for storing cassettes comprising
   a first deck including means for supporting a plurality of cassettes in a first plane and having a designated cassette pick-up position,
   a second deck including means for supporting a plurality of cassettes in a second plane parallel with and displaced from said first plane,
   first reciprocating cassette drive means for moving each of said cassettes in said first deck in a first direction and simultaneously moving each of the cassettes in said second deck in the opposite direction including means for transferring said cassettes between said decks, whereby said cassettes are caused to successively be positioned in said pick-up position, and
   robot arm means for removing one of said cassettes from and replacing it in said pick-up position.

2. The combination as claimed in claim 1 wherein said reciprocating cassette drive means moves said cassettes in said first deck away from said pick-up position and said cassettes in said second deck toward said pick-up position.

3. The combination as claimed in claim 2 wherein said means for transferring said cassettes between said decks includes
   first deck transfer means for transferring a cassette from a predetermined position in said first deck to a parallel position in said second deck, and
   second deck transfer means for transferring a cassette from a predetermined position in said second deck to said pick-up position in said first deck.

4. The combination as claimed in claim 3 including retention means for retaining a cassette in said pick-up position subsequent to its transfer to prevent the return of said cassette to said second deck.

5. The combination as claimed in claim 3 wherein said reciprocating cassette drive means includes first and second horizontally movable ram means, said first ram means moving said cassettes in said first deck in a first direction relative to said pick-up position,
   said second ram means moving said cassettes in said second deck in a second direction opposite from said first direction.

6. The combination as claimed in claim 3 including locking means locking said cassettes in said first deck from movement in a direction toward said pick-up position and said cassettes in said second deck against movement in a direction away from said pick-up position.

7. The combination as claimed in claim 1 wherein said robot arm means includes gripper means having a movable clamping member for releasably supporting each of said cassettes while removing it from or replacing it in said pick-up position.

8. The combination as claimed in claim 7 including means responsive to said reciprocating player means for actuating said gripper means.

9. The combination as claimed in claim 7 wherein said gripper means includes
   rigid contact means for engaging one surface of one of said cassettes at not less than two spaced points, said clamping member engaging the opposite surface of said cassette, and
   rotary drive means forming part of said robot arm means for moving said clamping member into and out of engagement with said cassette.

10. The combination as claimed in claim 9 including spring bias means forming part of said rotary drive means for permitting limited movement of said clamping member by external forces.

11. The combination as claimed in claim 9 wherein said rotary drive means includes
    an electric motor,
    a lead screw connected to said motor, gripper actuating means operatively coupled to said lead screw,
    a mechanical stop limiting the stroke of said lead screw, and
    means for sensing the load on said motor for interrupting the operation of said motor when said gripper actuating means engages said mechanical stop.

12. The combination as claimed in claim 11 including resilient means interposed between said mechanical stop and said gripper actuating means for storing energy when said gripper actuating means comes to a stop and releasing said energy when the direction of movement of said gripper actuating means is reversed.

13. The combination as claimed in claim 12 wherein said resilient means comprises an O-ring of resilient material.

14. The combination as claimed in claim 7 including a tape drive having a pre-defined entrance position, sensor means responsive to the presence of a cassette in said entrance position to activate said gripper means to transfer said cassette to said pick-up position.

15. The combination as claimed in claim 7 including switch means responsive to motion of said gripper means in a direction away from said tape drive for interrupting the movement of said gripper means.

16. The combination as claimed in claim 15 including sensor means responsive to the presence of a cassette in said entrance position to re-activate the movement of said gripper means to transfer said cassette to said pick-up position.

17. The combination as claimed in claim 1 including an electric motor, means including a slip clutch connecting said motor to said reciprocating cassette drive means, means mechanically limiting the excursion of said reciprocating cassette drive means, and means responsive to increased load on said motor for interrupting the current to said motor.

18. The combination as claimed in claim 17 wherein said slip clutch comprises
a bushing, and
a rotatable sleeve surrounding said bushing and having a slightly oval shape whereby pressure is exerted between said sleeve and said bushing at diametrically opposing points.

19. The combination as claimed in claim 18 wherein said bushing is formed of plastic.

20. The combination as claimed in claim 18 wherein said collar is formed of spring steel.

21. The combination as claimed in claim 18 wherein said collar is formed of beryllium bronze.

22. The combination as claimed in claim 18 wherein said collar is formed of stainless steel.

23. The combination as claimed in claim 6 including
a tape drive for recording on or playing from a tape cassette,
a control lever having first, second and third triangularly spaced connecting points,
motor drive means for reciprocating said control lever along a linear path in a plane parallel with the direction of movement of said cassettes in said decks, and
track means for guiding said robot arm means along first and second restricted sequential paths, the first path extending substantially perpendicular to said plane of said decks and said second path extending generally parallel with the plane of said decks, whereby reciprocating movement of said drive means causes said robot arm means to move from a first position for placing said cassette into or removing it from one of said decks along a generally L-shaped path to a position for placing the cassette into or removing it from said tape drive.

24. The combination claimed in claim 23 including
an electric motor having an output shaft coupled to said control lever,
means for reversing the direction of rotation of said motor to produce the reciprocating movement of said control lever, and
mechanical stop means for limiting the movement of said control lever in each direction.

25. The combination as claimed in claim 24 including
a slip clutch interposed between said motor and said control lever,
sensor means coupled to said electric motor for detecting increased motor load occasioned by said control lever abutting said mechanical stop means, and
means under the control of said sensor means for deactivating said motor.

26. The combination as claimed in claim 25 wherein said slip clutch includes
a bushing, and
a collar of spring metal surrounding said bushing and having a generally slight oval shape and making contact with the outer surface of said bushing at opposing points.

27. The combination as claimed in claim 26 wherein said bushing is formed of plastic and said collar is formed of spring steel.

28. A tape drive and multiple-cassette storage system comprising
a housing,
a tape drive unit in said housing having a cassette entrance position,
a removable magazine in said housing including
a plurality of tape cassettes,
a first deck supporting a plurality of said cassettes in a first plane and having a designated cassette pick-up position,
a second deck supporting a plurality of said cassettes in a second plane displaced from and parallel with said first plane,
first reciprocating drive means for moving said cassettes in said first deck in a first direction,
second reciprocating drive means for moving said cassettes in said second deck simultaneously in the opposite direction from the movement of said cassettes in said first deck,
first deck transfer means for transferring a cassette directly from said first deck to a first designated position in said second deck, and
second deck transfer means for transferring a cassette from said second deck directly to a second designated position in said first deck, whereby said cassettes are caused to follow a rectangular path and successively occupy said pick-up position, and
means for transferring a cassette from said pick-up position to said entrance position.

29. The combination as claimed in claim 28 including
motor drive means in said housing operatively coupled to said first and second reciprocating drive means, and
means automatically disconnecting said motor drive means from said first and second reciprocating drive means when said magazine is removed from said housing and reconnecting said drive means when the magazine is replaced.

30. The combination claimed in claim 29 including
robot arm means for removing one of said cassettes from said pick-up position and delivering it to said entrance position and for returning said cassette from said entrance position to directly said pick-up position.

31. In a system for storing tape cassettes in a magazine and automatically removing them from and placing them in an entrance position to a tape drive, a cassette storage and transfer mechanism comprising
a first deck supporting a plurality of cassettes in a first plane and having a designated pick-up position,
a second deck supporting a plurality of decks in a second plane displaced from and parallel with said first plane,
first reciprocating motor drive means for moving said cassettes along said decks and transferring said cassettes between said decks
a rigid control member having first, second and third triangularly spaced connecting points,
second reciprocating motor drive means for moving said rigid control member angularly about said third connecting point and for moving said third connecting point linearly in a plane parallel with said decks, means rotatably connecting said reciprocating drive means to said control member at said first connecting point, a gripper mechanism for clamping one of said cassettes, means for guiding said gripper mechanism along a first path generally perpendicular to the plane of said decks and a second path generally parallel with the plane of said decks, means rotatably connecting said control member and said gripper mechanism at said second connecting point, said last-said means providing limited linear movement along an axis between said second and third connecting points between said control member and said gripper mechanism, and means connected to said third connection point for moving said control member along a path parallel with the plane of said decks, whereby said gripper mechanism is caused to move from a first position to a second position for placing a cassette into or removing it from said entrance position.

32. The combination as claimed in claim 31 including sensor means for sensing the presence of a cassette at said entrance position after being ejected by said tape deck, and means responsive to said sensor means for transferring said cassette from said entrance position to said pick-up position.

33. In a system for storing tape cassettes and automatically removing them from and replacing them in a magazine, a cassette storage and transfer mechanism comprising a linear cassette storage deck in said magazine positioned in a first plane supporting a plurality of tape cassettes, and having a designated pick-up position, means for successively positioning said cassettes in said pick-up position, a cassette gripper mechanism having a flexible gripping member having open and closed positions for gripping a cassette to be transferred, a horizontally extending rotatable actuating member operatively coupled to said gripping member, a cam arm secured to said actuating member and extending in a second plane generally perpendicular to said first plane, a control member having a cam surface extending in a direction parallel with said second plane, first motor drive means for transporting said gripper mechanism in a direction generally parallel with said second plane while said cam arm slidably engages said cam surface for removing a cassette from or replacing it in said pick-up position, and second motor drive means for moving said control member in a direction generally paralled with said first plane thereby to close said gripping member at any position of said gripping mechanism.

34. A cassette storage magazine including first and second linear decks each containing a plurality of cassettes in side-by-side relation, said decks being positioned in parallel displaced planes, reciprocating drive means for moving said cassettes of said first deck laterally in a first direction and simultaneously moving said cassettes of said second deck in a second direction, means for locking said cassettes of said first deck in position and preventing movement thereof in a direction opposite from said first direction, and means actuated by said reciprocating drive means for transferring a cassette from a predetermined position in said first deck to a predetermined position in said second deck.

35. The method of storing tape cassettes and selectively positioning them in a predetermined position for transfer to and from an external device comprising the steps of providing a plurality of tape cassettes, providing a first linear cassette deck lying in a first plane and having a designated pick-up position, providing a second linear cassette deck lying in a second plane displaced from and parallel with said first plane, arranging part of said cassettes in side-by-side relation in said first deck, arranging the remainder of said cassettes in side-by-side relation in said second deck, moving said cassettes repetitively along a rectangular path encompassing said first and second decks whereby said cassettes are moved at a first location from said first to said second deck and at a second location from said second to said first deck and placed successively in said pick-up position, removing one of said cassettes from said pick-up position and transferring it to said external device, and subsequently returning said cassette from said external device directly to said pick-up position.

36. The method as claimed in claim 35 wherein said external device is a tape drive having a cassette entrance position, and said step of transferring said cassette to said external device includes the steps of gripping a cassette in said pick-up position, transporting said cassette first along a path perpendicular to the plane of said decks and secondly along a path parallel with the plane of said decks to said entrance position, and releasing said cassette.

37. The method as claimed in claim 36 wherein the step of returning said cassette directly to said pick-up position includes the steps of sensing the presense of a cassette ejected by said tape drive at said entrance position, gripping said cassette, transporting said cassette along an L-shaped path to said pick-up position, and releasing said cassette.

* * * * *

UNITED STATES PATENT AND TRADEMARK OFFICE
CERTIFICATE OF CORRECTION

PATENT NO. : 5,184,260
DATED : February 2, 1993
INVENTOR(S) : Michel A. Pierrat

It is certified that error appears in the above-indentified patent and that said Letters Patent is hereby corrected as shown below:

Column 5, line 50: change "8C" second occurrence to --8D--

Column 5, line 67: change "C" to --8C--

Column 8, line 33: change "now" to --not--

Column 9, line 18: change "illustrted" to --illustrated--

Signed and Sealed this

Twenty-first Day of December, 1993

Attest:

BRUCE LEHMAN

*Attesting Officer*     *Commissioner of Patents and Trademarks*